United States Patent
Tamura et al.

(10) Patent No.: US 11,129,184 B2
(45) Date of Patent: Sep. 21, 2021

(54) WIRELESS COMMUNICATION TERMINAL, WIRELESS COMMUNICATION DEVICE, WIRELESS COMMUNICATION SYSTEM, AND PROCESSING METHOD FOR REQUESTING UPLINK RESOURCE

(71) Applicant: Panasonic Corporation, Osaka (JP)

(72) Inventors: Takashi Tamura, Kanagawa (JP); Toru Oizumi, Osaka (JP); Joachim Loehr, Langen (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1396 days.

(21) Appl. No.: 14/233,821

(22) PCT Filed: May 13, 2013

(86) PCT No.: PCT/JP2013/003058
§ 371 (c)(1),
(2) Date: Jan. 20, 2014

(87) PCT Pub. No.: WO2013/179590
PCT Pub. Date: Dec. 5, 2013

(65) Prior Publication Data
US 2014/0161086 A1 Jun. 12, 2014

(30) Foreign Application Priority Data
May 31, 2012 (JP) .............................. JP2012-123831

(51) Int. Cl.
*H04W 72/14* (2009.01)
*H04W 74/08* (2009.01)

(52) U.S. Cl.
CPC ........ *H04W 72/14* (2013.01); *H04W 74/0833* (2013.01)

(58) Field of Classification Search
CPC . H04W 48/08; H04W 72/14; H04W 72/1242; H04W 72/1284; H04W 72/1205;
(Continued)

(56) References Cited

U.S. PATENT DOCUMENTS

2009/0201865 A1* 8/2009 Uemura ................ H04L 5/0053
370/329
2009/0268693 A1* 10/2009 Lindh ................. H04W 72/042
370/336

(Continued)

OTHER PUBLICATIONS

Considerations on UE trigger RACH procedure, HTC, 3GPP TSG-RAN WG2 Meeting #75 R2-114522, Aug. 22, 2011.
(Continued)

*Primary Examiner* — Un C Cho
*Assistant Examiner* — Rasha K Fayed
(74) *Attorney, Agent, or Firm* — Pearne & Gordon LLP

(57) ABSTRACT

If an uplink resource is not granted, wireless communication terminal, when the uplink resource occurs in the corresponding wireless communication terminal, transmits a scheduling request using a dedicated scheduling request resource of a second cell that is smaller in cell coverage than a first cell, and if grant of the uplink resource in response to the scheduling request is not performed, the wireless communication terminal transmits a random access preamble and thus performs a random access procedure that requests the grant of the uplink resource from a wireless communication device.

18 Claims, 27 Drawing Sheets

(58) Field of Classification Search
CPC ... H04W 72/042; H04W 72/12; H04W 72/04;
H04W 74/08; H04W 74/0833; H04W
74/0866; H04W 74/002; H04W 74/006;
H04W 74/00; H04W 56/00; H04W
56/0045; H04W 88/08; H04W 88/02;
H04W 52/02; H04W 52/365; H04W
52/346; H04W 52/146; H04W 52/34;
H04W 52/14; H04W 4/00; H04W 76/02;
H04W 28/04; H04W 28/06; H04W 24/00;
H04W 24/10; H04L 1/1854; H04L
1/1819; H04L 1/1864; H04L 1/18; H04L
1/16; H04L 1/1671; H04L 1/1825; H04L
1/188; H04L 5/00; H04L 5/0007; H04L
5/0094; H04L 29/08; H04L 29/06; H04L
29/40; H04L 12/40143; H04L 12/4015
USPC ....... 370/329, 450, 436, 328, 248, 341, 324,
370/350, 455, 458, 496, 348; 455/452.1,
455/418; 375/143, 152
See application file for complete search history.

(56) References Cited

U.S. PATENT DOCUMENTS

| | | | |
|---|---|---|---|
| 2011/0134774 A1* | 6/2011 | Pelletier | H04L 5/001 370/252 |
| 2012/0039263 A1* | 2/2012 | Moberg | H04W 72/1284 370/329 |
| 2012/0127930 A1* | 5/2012 | Nguyen | H04W 74/002 370/329 |
| 2012/0147830 A1* | 6/2012 | Lohr | H04L 1/1854 370/329 |
| 2012/0269154 A1* | 10/2012 | Wang | H04W 72/1284 370/329 |
| 2013/0070700 A1* | 3/2013 | Chang | H04W 74/08 370/329 |
| 2013/0188473 A1* | 7/2013 | Dinan | H04W 74/0833 370/216 |
| 2013/0188612 A1* | 7/2013 | Dinan | H04W 72/042 370/336 |
| 2013/0258862 A1* | 10/2013 | Dinan | H04W 56/00 370/241 |
| 2014/0029558 A1* | 1/2014 | Frederiksen | H04L 5/001 370/329 |
| 2015/0078286 A1* | 3/2015 | Kim | H04W 48/00 370/329 |
| 2018/0098354 A1* | 4/2018 | Dinan | H04W 74/0833 |

OTHER PUBLICATIONS

Contention Based SCell RACH, LG Electronics Inc., 3GPP TSG-RAN2 Meeting #75 R2-114424, Aug. 22, 2011.

3rd Generation Partnership Project; Technical Specification Group Radio Access Network; Evolved Universal Terrestrial Radio Access (E-UTRA); Evolved Universal Terrestrial Radio Access (E-UL-TRA) Medium Access Control (MAC) protocol specification, 3GPP TS36.321 V10.4.0, (Release 10) Dec. 2011.

3rd Generation Partnership Project; Technical Specification Group Radio Access Network; Evolved Universal Terrestrial Radio Access (E-UTRA); Evolved Universal Terrestrial Radio Access (E-UL-TRA) Medium Access Control (RRC); Protocol specification, 3GPP TS36.331 V10.4.0, (Release 10) Dec. 2011.

International Search Report for Application No. PCT/JP2012/003058 dated Aug. 13, 2013.

* cited by examiner

WIRELESS COMMUNICATION TERMINAL, WIRELESS COMMUNICATION DEVICE, WIRELESS COMMUNICATION SYSTEM, AND PROCESSING METHOD FOR REQUESTING UPLINK RESOURCE

TECHNICAL FIELD

The present disclosure relates to a wireless communication device that receives a scheduling request transmitted by a wireless communication terminal, a wireless communication terminal, a wireless communication system and a processing method for requesting an uplink resource.

BACKGROUND ART

The 3rd generation partnership project (3GPP) advances standardization of Long Term Evolution Advanced (LTE-Advanced: LTE-A) as a next communication standard that is compatible with a long term evolution (LTE) method. In LTE, a wireless communication device (hereinafter referred to an "NE" (Network Entity)) of a network (Evolved Universal Terrestrial Radio Access Network: E-UTRAN) provides one or more communication cells.

The wireless communication device is an apparatus that is an access point of wireless communication terminal (User Equipment: UE), such as a radio communication base station (E-UTRAN NodeB: eNB), a remote radio head (RRH) base station, and a relay apparatus (relay or repeater). The wireless communication terminal belongs to one communication cell among one or more communication cells that are provided by the wireless communication device. Moreover, there is a case in which the wireless communication terminal uses multiple frequencies and belongs to the multiple communication cells. Furthermore, there is a case where the wireless communication terminal performs receiving from and transmitting to the multiple communication cells over one frequency. The wireless communication device is referred to as a "base station," the wireless communication terminal is referred to as "equipment," and the communication cell is referred to as a "cell."

CITATION LIST

Non Patent Literature

[NPL 1] 3GPP TS36.321 V10.4.0, "Evolved Universal Terrestrial Radio Access (E-ULTRA) Medium Access Control (MAC) protocol specification."
[NPL 2] 3GPP TS36.331 v10.4.0, "Evolved Universal Terrestrial Radio Access (E-UTRA) Radio Resource Control (RRC)."

SUMMARY OF INVENTION

Technical Problem

In the LTE, a "scheduling request (SR) is used in order for the equipment to request a physical uplink shared channel resource (PUSCH) necessary for new transmission. Furthermore, a physical uplink control channel (PUCCH) resource (hereinafter referred to as a "dedicated scheduling request: D-SR") is set in order for the equipment to transmit the scheduling request (SR). In the case where the dedicated scheduling request resource is granted, when uplink data occurs in the equipment and thus is available for transmission, the corresponding equipment transmits the scheduling request (SR) using the dedicated scheduling request resource, if an uplink resource is not granted. In contrast, in the case where the dedicated scheduling request resource is not granted, if the uplink data occurs in the equipment and thus is available for transmission, the corresponding equipment starts a random access procedure in order to obtain the grant of the uplink resource, when the uplink is not granted.

With regard to LTE-Advanced, a method of granting the dedicated scheduling request resource only to a primary serving cell (PCell) has been discussed, for the dedicated scheduling request resource to be granted to the equipment. If the multiple wireless communication devices operate cells that are different in cell coverage, with different frequencies, as in heterogeneous network (HetNet) illustrated in FIG. 27, it is considered that the equipment is connected to the multiple cells at the same time. In this case, in order to make mobility control of the equipment to be easily performed, it is considered that a cell (for example, a macrocell) that is larger in cell coverage is used as PCell, and a cell (for example, a low transmission power cell such as a pico cell or a femto cell) that is smaller in cell coverage is used as a secondary serving cell (SCell). However, in PCell, propagation loss is large between the equipment and the wireless communication device, compared to SCell. Because of this, transmission power for the equipment is set to be high when transmitting a packet that uses PCell, and as a result, power consumption of the equipment is increased.

An object of the present disclosure is to provide wireless communication terminal, a wireless communication device, and a wireless communication system that are capable of maintaining reliability of connectivity between the wireless communication devices while reducing power consumption in the wireless communication terminal and a method of processing an uplink resource request.

Solution to Problem

This disclosure is a wireless communication terminal in which, among two types of cells that make up a component career set that is used in career aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal comprising:
a DSR management section configured to, when uplink data occurs in the wireless communication terminal, perform processing that requests the grant of the uplink resource to the wireless communication device by transmitting the scheduling request to the wireless communication device using the dedicated scheduling request resource of the second cell, if the uplink resource is not granted to the wireless communication terminal; and
a RACH management section configured to perform a random access procedure that requests the grant of the uplink resource to the wireless communication device by transmitting a random access preamble to the wireless communication device, if the grant of the uplink resource in response to the scheduling request is not performed.

This disclosure is a wireless communication terminal in which among two types of cells that make up a component career set that is used in career aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal comprising:

a comparison section configured to, when uplink data occurs in the wireless communication terminal, compare a path loss value that is present when a scheduling request is transmitted to the wireless communication device using the dedicated scheduling request resource of the second cell, with a threshold, if the uplink resource is not granted to the wireless communication terminal;

a DSR management section configured to perform processing that requests the grant of the uplink resource to the wireless communication device by transmitting the scheduling request to the wireless communication device using the dedicated scheduling request resource of the second cell, if the path loss value is at the threshold or above; and a RACH management section configured to perform a random access procedure in the first cell that requests the grant of the uplink resource to the wireless communication device by transmitting a random access preamble to the wireless communication device, if the path loss value is below the threshold.

This disclosure is a wireless communication terminal in which among two types of cells that make up a component career set that is used in career aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal comprising:

a priority determination section configured to, when uplink data occurs in the wireless communication terminal, determine whether the uplink data is of high priority or of low priority using a predetermined determination method, if the uplink resource is not granted to the wireless communication terminal;

a DSR management section configured to perform processing that requests the grant of the uplink resource to the wireless communication device by transmitting the scheduling request to the wireless communication device using the dedicated scheduling request resource of the second cell, if it is determined that the uplink data is of low priority; and a RACH management section configured to perform a random access procedure in the first cell that requests the grant of the uplink resource to the wireless communication device by transmitting a random access preamble to the wireless communication device, if it is determined that the uplink data is of high priority.

This disclosure is a wireless communication terminal in which if among two types of cells that make up a component career set that is used in career aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal comprising:

a priority determination section configured to, when uplink data occurs in the wireless communication terminal, determine whether the uplink data is of high priority or of low priority using a predetermined determination method, if the uplink resource is not granted to the wireless communication terminal; and a DSR management section configured to perform processing that requests the grant of the uplink resource from the wireless communication device by transmitting the scheduling request to the wireless communication device using the dedicated scheduling request resource of the first cell or the second cell, wherein the DSR management section is configured to transmit the scheduling request using the dedicated scheduling request resource of the second cell if it is determined that the uplink data is of low priority, and the DSR management section is configured to transmit the scheduling request using the dedicated scheduling request resource of the first cell if it is determined that the uplink data is of high priority or if the uplink source is not granted although the scheduling request is transmitted in the second cell.

This disclosure is a wireless communication device, capable of communicating with wireless communication terminal which among two types of cells that make up a component carrier set that is used in carrier aggregation, provides a second cell that is smaller in cell coverage than a first cell, wherein the wireless communication device is configured to transmit dedicated control information that includes configuration information relating to a dedicated scheduling request resource of the second cell that is available to the wireless communication terminal, to the wireless communication terminal.

This disclosure is a wireless communication system comprising:

a wireless communication device, capable of communicating with wireless communication terminal which among two types of cells that make up a component carrier set that is used in carrier aggregation, provides a second cell that is smaller in cell coverage than a first cell; and wireless communication terminal in which a dedicated scheduling request resource that is used when transmitting a scheduling request for requesting grant of an uplink resource to the wireless communication device is set for the second cell, wherein the wireless communication device is configured to transmit dedicated control information that includes configuration information relating to a dedicated scheduling request resource of the second cell that is available to the wireless communication terminal, to the wireless communication terminal, and wherein the wireless communication terminal includes a DSR management section configured to, when uplink data occurs in the wireless communication terminal, perform processing that requests the grant of the uplink resource to the wireless communication device by transmitting the scheduling request to the wireless communication device using the dedicated scheduling request resource of the second cell, if the uplink resource is not granted to the wireless communication terminal, and a RACH management section configured to perform a random access procedure that requests the grant of the uplink resource to the wireless communication device by transmitting a random access preamble to the wireless communication device, if the grant of the uplink resource in response to the scheduling request is not performed.

This disclosure is a method of processing an uplink resource request, for use in wireless communication terminal in which a dedicated scheduling request resource that is used when transmitting a scheduling request for requesting grant of an uplink resource to a wireless communication device that is capable of communicating with the wireless communication terminal is set for a second cell that is smaller in cell coverage than a first cell, among two types of cells that make up a component carrier set that is used in carrier aggregation, the method comprising:

performing processing that requests the grant of the uplink resource to the wireless communication device by transmitting the scheduling request to the wireless communication device using the dedicated scheduling request resource of the second cell when uplink data occurs in the wireless communication terminal if the uplink resource is not granted to the wireless communication terminal; and performing a random access procedure that requests the grant of the uplink resource to the wireless communication device by transmitting a random access preamble to the wireless communication device if the grant of the uplink resource in response to the scheduling request is not performed.

Advantageous Effects of Invention

In the wireless communication terminal, the wireless communication device, the wireless communication system, and the method of processing an uplink resource request according to the present disclosure, reliability of connectivity between the wireless communication terminal and the wireless communication device while reducing power consumption in the wireless communication terminal can be maintained.

DESCRIPTION OF EMBODIMENTS

Figure 1:
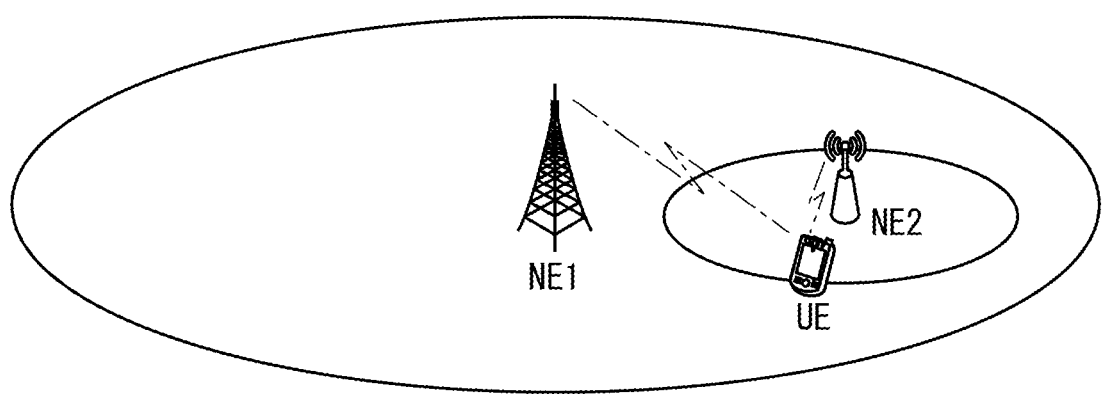
FIG. 1 is a diagram illustrating one example of wireless communication system in a HetNet environment in which first to fifth embodiments are applied.

A scheduling request (SR) in LTE is used to make a request for an uplink shared channel resource (Physical Uplink Shared Channel: PUSCH) for new transmission by wireless communication terminal, to a wireless communication device. The wireless communication terminal is regarded as putting a scheduling request (SR) on hold from the scheduling request (SR) being triggered until the corresponding scheduling request (SR) being canceled. Because of this, in the case where medium access control packet data units (MAC PDU) are put together and the MAC PDU includes a buffer status report (BSR) that includes a buffer state that is present until a final event that triggers BSR, all the scheduling requests (SR) put on hold are canceled and a timer (sr-ProhibitTimer) is stopped. Alternatively, in the case where an uplink grant (UL grant) can make all data put on hold adaptable in a manner that all data put on hold is transmittable, all the scheduling requests (SR) put on hold are canceled and the timer (sr-ProhibitTimer) is stopped.

If the scheduling request (SR) is triggered and the scheduling request (SR) put on hold is not present, the wireless communication terminal sets a counter (SR_COUNTER) to 0. While one scheduling request (SR) is put on hold, the wireless communication terminal has to perform the following operations at each transmission time interval (TTI).

(1) When the uplink shared channel resource is not valid for transmission at TTI, if a PUCCH resource that is set for the purpose of the scheduling request (SR) is not effective at any TTI, the wireless communication terminal starts a random access procedure and cancels all the scheduling request (SR) put on hold.

(2) When the uplink shared channel resource is not valid for transmission at such TTI, in cases other than the one described above, the PUCCH resource that is set for the purpose of the scheduling request (SR) at such TTI is valid. Therefore, if such TTI is not one part of a measurement gap, and the timer (sr-ProhibitTimer) does not run, a MAC layer of the wireless communication terminal performs the following operations.

If a counter (SR_COUNTER) value is smaller than a maximum number of times of transmission (dsr-TransMax), the MAC layer of the wireless communication terminal,
(1) increases the counter (SR_COUNTER) value by 1,
(2) instructs a physical layer to transmit a signal of the scheduling request over a PUCCH resource, and
(3) starts the timer (sr-ProhibitTimer).

On the other hand, in cases other than the one described above, a MAC layer of the wireless communication terminal,
(1) reports release of PUCCH/SRS to radio resource control (RRC),
(2) clears downlink grant and the uplink grant that are set, and
(3) starts the random access procedure and cancels all the scheduling requests (SR) put on hold.

The physical layer of the wireless communication terminal transmits the scheduling request (SR) to the wireless communication device in response to an instruction from the MAC layer of the wireless communication terminal. Furthermore, an RRG layer releases an individual configuration of PUCCH/SRS in response to the instruction from the MAC layer. The timer (sr-ProhibitTimer) is used only when set with control information and a value thereof also is set with the control information. When the timer (sr-ProhibitTimer) expires, the wireless communication terminal stops the timer (sr-ProhibitTimer). Moreover, the maximum number of times of transmission (dsr-TransMax) also is set with the control information.

A wireless communication system according to an embodiment relating to the present disclosure is described in detail below referring to the drawings. The wireless communication system described below according to the embodiment includes at least one piece of wireless communication terminal and the multiple wireless communication devices that are capable of communicating with the wireless communication terminal over a wireless communication network. In the following description, the wireless communication terminal is referred to as "equipment." The equipment is, for example, a portable telephone. Furthermore, in the following description, the wireless communication device is an apparatus that is referred to in order to collectively mean a radio communication base station (E-UTRAN NodeB: eNB), a remote radio base station (RemoteRadio Head: RRH) that is located away from the radio communication base station, a relay apparatus (relay node or repeater) that is wirelessly connected with the radio communication base station and so forth, a femto cell base station and a pico base station, and others that are capable of wirelessly communicating with the equipment. Moreover, the remote radio base station (RRH) has the same function as a radio frequency section (RF section) of the radio communication base station (eNB) and is connected to the radio communication base station (eNB) with a wire cable such as an optical fiber cable.

The wireless communication system uses a mobile communication technology, such as LTE or LTE-Advanced, which is standardized in the 3rd generation partnership project (3GPP). However, the mobile communication technology that is used by the wireless communication system is not limited to the standard described above, and may be worldwide interoperability for microwave access (WiMAX), such as a wireless local area network (wireless LAN), IEEE 802.16, IEEE 802.16e, or IEEE 802.16m, 3GPP2, system architecture evolution (SAE), a universal mobile telecommunication system (UMTS), or a fourth generation mobile communication standard.

Each wireless communication device makes up at least one communication cell. The communication cell refers to a radio network object that the equipment can identify uniquely based on an identifier that is granted to a geographical area or a difference between frequencies that are used in the corresponding geographic area.

In the following description, the communication cell is simply referred to as a "cell." One or more cells are configured with respect to each of one or more carrier frequencies by one wireless communication device or one receiving point. Moreover, the configuration described above is a basic conception, and thus the wireless communication device may cooperate with other wireless communication devices to make up one cell. The equipment communicates using at least one cell that the wireless communication device makes up.

Wireless communication systems according to first to fifth embodiments are described below. Moreover, in the first to fifth embodiments, like constituent elements are given like reference numerals and overlapping descriptions thereof are omitted.

FIG. 1 is a diagram illustrating one example of the wireless communication system in a HetNet environment in which the first to fifth embodiments are applied. As illustrated in FIG. 1, a wireless communication device NE1 that provides a cell (for example a macrocell) that is great in cell coverage but is great in propagation loss and a wireless communication device NE2 that provides a cell (for example, a low transmission power cell such as a pico cell or a femto cell) that is small in cell coverage but is small in propagation loss are provided in the wireless communication system in the heterogeneous network (HetNet) environment. In the corresponding wireless communication system, the cell provided by the wireless communication device NE1 is used as PCell and the cell provided by the wireless communication device NE2 is used as SCell. Furthermore, carrier aggregation that uses PCell and SCell that make up one component carrier set is set in the equipment UE.

First Embodiment

A wireless communication system according to a first embodiment is described referring to FIG. 2 to FIG. 8. The wireless communication system according to the first embodiment is configured from the equipment and the wireless communication device that are described above. The equipment transmits the scheduling request (SR) to the wireless communication device in order for the wireless communication device to set an uplink resource for the equipment. The wireless communication device sets the uplink resource for the equipment. Furthermore, the wireless communication device performs grant of a radio resource (for example, a frequency band in a frequency domain or a time domain) to each piece of equipment and management of the radio resource and has a role of an access point of a radio access network for the equipment.

Figure 2:
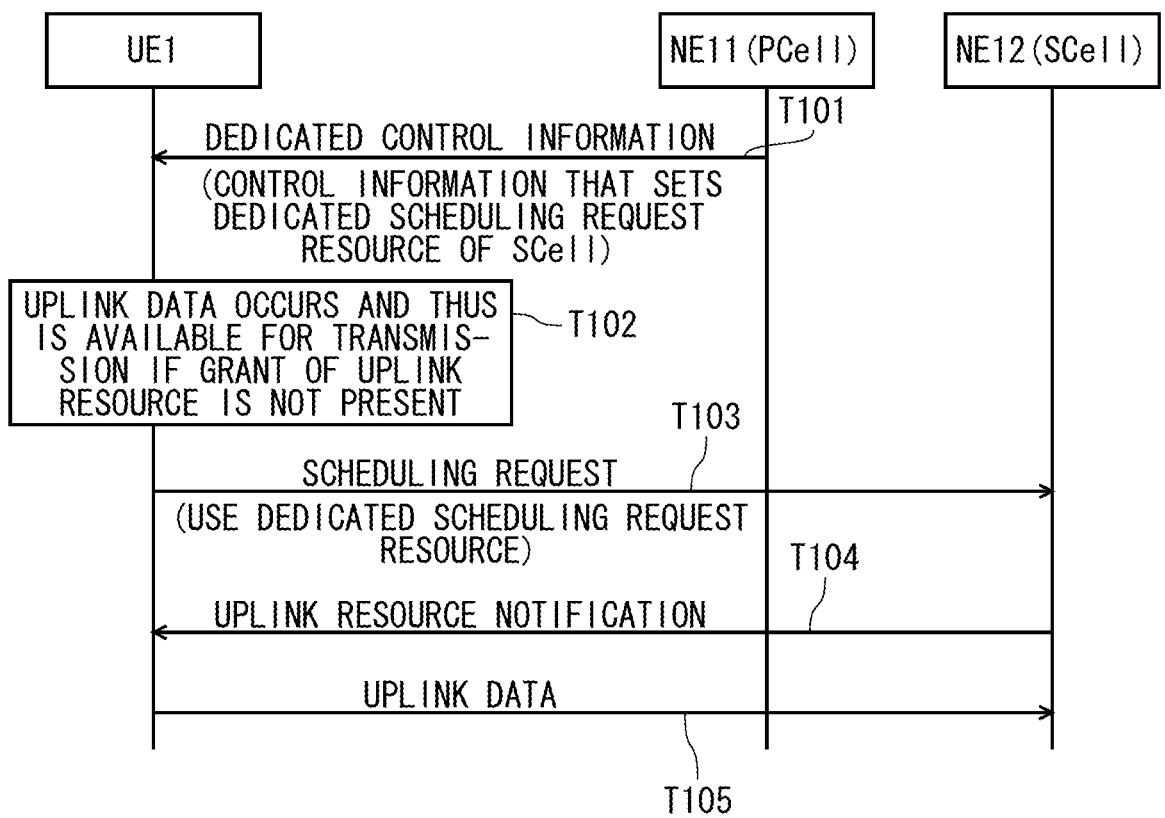
FIG. 2 is a timing chart that includes processing between equipment UE1 and wireless communication devices NE11 and NE12 in the wireless communication system according to a first embodiment.
Figure 3:
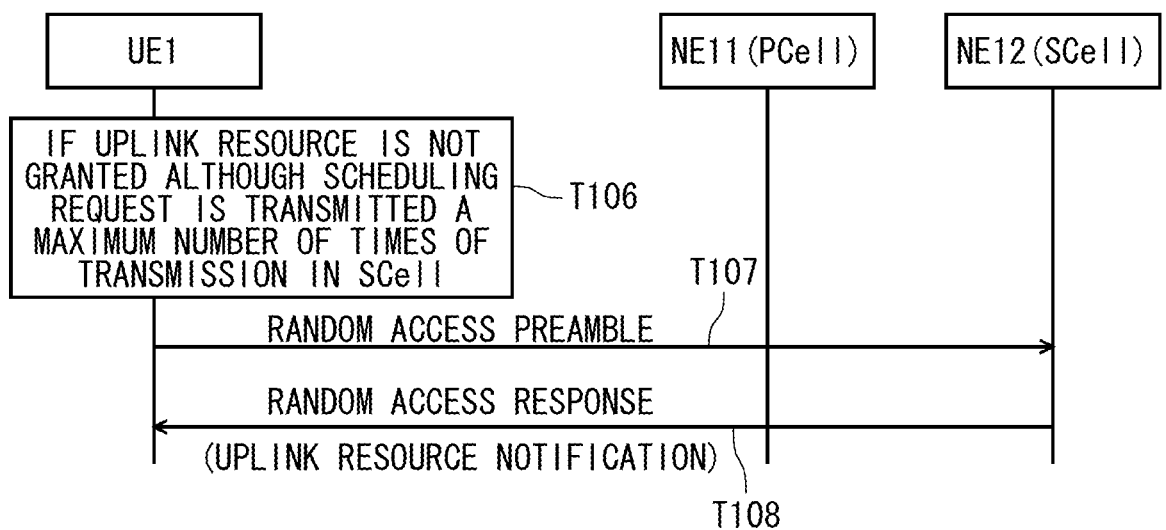
FIG. 3 is a diagram illustrating one example of a timing chart that includes processing performed between the equipment UE1 and the wireless communication device NE12 if uplink resource is not granted although the equipment UE1 performs a scheduling request.
Figure 4:
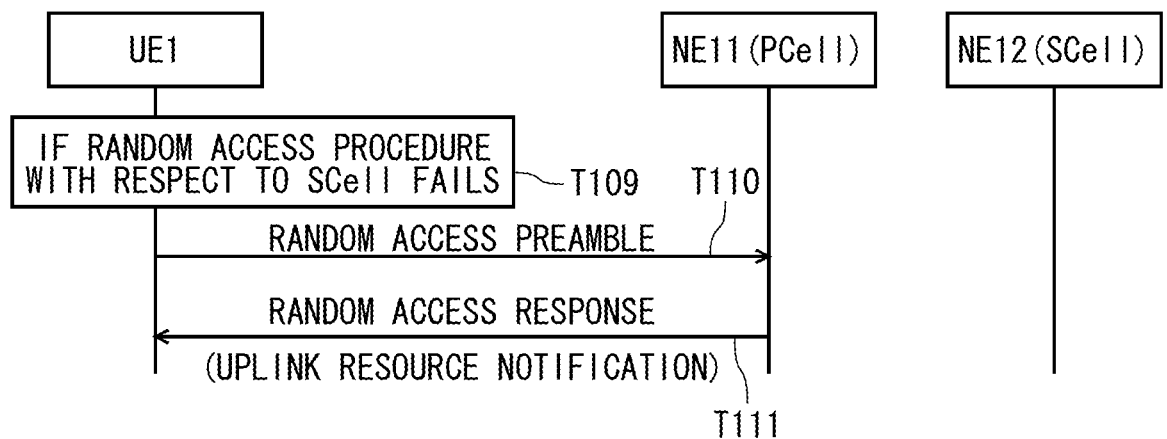
FIG. 4 is a diagram illustrating one example of a timing chart that includes processing performed between the equipment UE1 and the wireless communication device NE11 if the random access procedure with respect to the wireless communication device NE12 illustrated in FIG. 3 fails.

FIG. 2 to FIG. 4 are diagrams, each illustrating a timing chart that includes processing between equipment UE1 and wireless communication devices NE11 and NE12 in the wireless communication system according to the first embodiment. Moreover, the equipment UE1 is equivalent to the equipment UE illustrated in FIG. 1, the wireless communication device NE11 is equal to the wireless communication device NE1 illustrated in FIG. 1, and the wireless communication device NE12 is equal to the wireless communication device NE2 illustrated in FIG. 1. Furthermore, the carrier aggregation, which uses PCell provided by the wireless communication device NE11 and SCell provided by the wireless communication device NE12 as one component carrier set, is set in the equipment UE1.

As illustrated in FIG. 2, the wireless communication device NE11 transmits dedicated control information, which includes control information that sets a dedicated scheduling request resource of SCell for the equipment UE1, to the equipment UE1 (T101). Moreover, the maximum number of times for transmission of the scheduling request is included in the corresponding control information. Moreover, random-access-permissible information may be included in the dedicated control information. If the uplink resource is not granted to the equipment UE1 in SCell, the random-access-permissible information is used to permit starting of the random access procedure in which the equipment plays a leading role in SCell. By doing this, the wireless communication device NE12 that does not permit the random access procedure in which the equipment plays a leading role and the wireless communication device NE11 that permits the random access procedure can coexist because the equipment UE1 does not start the random access procedure arbitrarily in SCell. Moreover, the random-access-permissible information may be one-bit information and be information linked with other configuration information. For example, if the configuration information on the dedicated scheduling request resource of SCell is set for the equipment UE1, the starting of the random access procedure in which the equipment plays a leading role in SCell may be permitted.

In the processing T101 described above, the dedicated control information is transmitted with an RRC connection setup message, an RRC connection reconfiguration message, or other RRC messages, or with signaling of the MAC layer or of the physical layer. Moreover, the dedicated control information may be transmitted by the wireless communication device NE12.

If in the case of the absence of the grant of the uplink resource, the uplink data occurs and thus is available for transmission (T102), the equipment UE1 transmits the scheduling request (SR) to the wireless communication device NE12 using the dedicated scheduling request resource of SCell (T103). The wireless communication device NE12 notifies the equipment UE1 of the uplink resource that is granted in response to the received scheduling request (SR) (T104). The equipment UE1 transmits the uplink data to the wireless communication device NE12 using the uplink resource, the notification of which is given (T105).

In this manner, the equipment UE1 transmits the scheduling request to the wireless communication device NE12 using the dedicated scheduling request resource of SCell, not in PCell that is great in cell coverage. In this case, the equipment UE1 reduces power consumption when transmitting the scheduling request because the equipment UE1 can transmit the scheduling request with low transmission power compared to the case of using the dedicated scheduling request resource of PCell. Furthermore, the multiple SCells that are present within the cell coverage of PCell with the cell coverage of SCell being smaller than the cell coverage of PCell can be used as the dedicated scheduling request resource at the same time. Because of this, a frequency resource is effectively utilized, and spectral efficiency is increased, compared to the case of using the dedicated scheduling request resource of PCell.

Moreover, when receiving the scheduling request (SR) transmitted from the equipment UE1 in the processing T103, the wireless communication device NE12 may notify the wireless communication device NE11 that the scheduling request (SR) is received from the equipment UE1. In this case, the wireless communication device NE11 sets the uplink resource for the equipment UE1. In this manner, if any one of the wireless communication device NE11 and the wireless communication device NE12 can set the uplink resource, the optimal uplink resource can be granted to the equipment UE1 according to an amount of traffic in or reception quality of the equipment UE1.

FIG. 3 is a diagram illustrating one example of a timing chart that includes processing performed between the equipment UE1 and the wireless communication device NE12 if the uplink resource is not granted although the equipment UE1 performs the scheduling request. As illustrated in FIG.

3, after the processing T103 illustrated in FIG. 2, although the equipment UE1 transmits the scheduling request to the wireless communication device NE12 up to the maximum number of times of transmission that is set with the control information, if the uplink resource is not granted (T106), the equipment UE1 starts the random access procedure that uses a physical random access channel (PRACH) resource of SCell and thus transmits a random access preamble to the wireless communication device NE12 (T107). The wireless communication device NE12 creates a random access response that includes a notification of the uplink resource and transmits the created random access response to the equipment UE1 (T108). When receiving the random access response, the equipment UE1 transmits the uplink data to the wireless communication device NE12 using the uplink resource, the notification of which is given by the corresponding random access response.

In this manner, although the grant of the uplink resource according to the scheduling request is not performed, the equipment UE1 transmits the random access preamble to wireless communication device NE12 that is smaller in propagation loss than the wireless communication device NE11. Therefore, the equipment UE1 can reduce power consumption when transmitting the random access preamble.

Moreover, when receiving the random access preamble transmitted from the equipment UE1 in the processing T108, the wireless communication device NE12 may notify the wireless communication device NE11 that the wireless communication device NE12 receives the random access preamble from the equipment UE1. In this case, the wireless communication device NE11 transmits the random access response to the equipment UE1.

However, the wireless communication device NE11 transmits the random access response in the multiple SCells. Because of this, the equipment UE1 needs a method of recognizing the random access response of SCell to the random access preamble transmitted by the equipment UE1.

In a first method, a contention between PCell and SCell and between SCells is prevented by devising setting of a random access channel for the random access response that the wireless communication device NE11 can transmit.

In a second method, an identifier for recognizing the random access preamble is included within the random access response.

In a third method, the random access response to the random preamble transmitted by the equipment UE1 can be found by devising an identifier RA-RNTI (Random Access Radio Network Temporary Identity) according to a resource of the random access preamble.

When this is done, the equipment UE1 receives the random access response from the wireless communication device NE11 and thus the uplink resource is granted to the equipment UE1. Therefore, even in the case of transmitting the random access preamble to the wireless communication device NE12 that is smaller in propagation loss than the wireless communication device NE11, the equipment UE1 can receive the random access response using a downlink channel of the wireless communication device NE11 that is greater in cell coverage. As a result, success probability of the random access procedure is increased.

FIG. 4 is a diagram illustrating one example of a timing chart that includes processing performed between the equipment UE1 and the wireless communication device NE11 if the random access procedure with respect to the wireless communication device NE12 illustrated in FIG. 3 fails. As illustrated in FIG. 4, if it is determined after the processing T107 illustrated in FIG. 3 that the random access procedure fails for some reason, such as the reason that the equipment UE1 cannot receive the random access response (T109), the equipment UE1 starts the random access procedure using PRACH (physical random access CHannel) resource of PCell and thus transmits the random access preamble to the wireless communication device NE11 (T110). The wireless communication device NE11 creates the random access response that includes notification of the uplink resource and transmits the created random access response to the equipment UE1 (T111). When receiving the random access response, the equipment UE1 transmits the uplink data to the wireless communication device NE11 using the uplink resource, the notification of which is given by the corresponding random access response.

In this manner, although the random access procedure with respect to the wireless communication device NE12 fails, the equipment UE1 can avoid a situation in which the uplink resource is not granted, by transmitting the random access preamble to the wireless communication device NE11.

As described above, although the scheduling request is performed using the dedicated scheduling request resource of SCell, if the uplink resource is not granted, the equipment UE1 according to the present embodiment performs the random access procedure using the PRACH resource of SCell. Since SCell is smaller in propagation loss than PCell, according to the present embodiment, the equipment UE1 can decrease the transmission power when requesting the uplink resource from the wireless communication device NE12 and, as a result, can reduce power consumption in the equipment UE1. Furthermore, if the cell coverage of SCell is smaller than the cell coverage of PCell, and multiple SCells are present within the coverage of PCell, an uplink (UL) of each SCell can be used between different SCells at the same time. Because of this, the frequency resource can be effectively utilized compared to the case where only the uplink of PCell is used.

[Configuration of the Equipment UE1 According to the First Embodiment]

Figure 5:
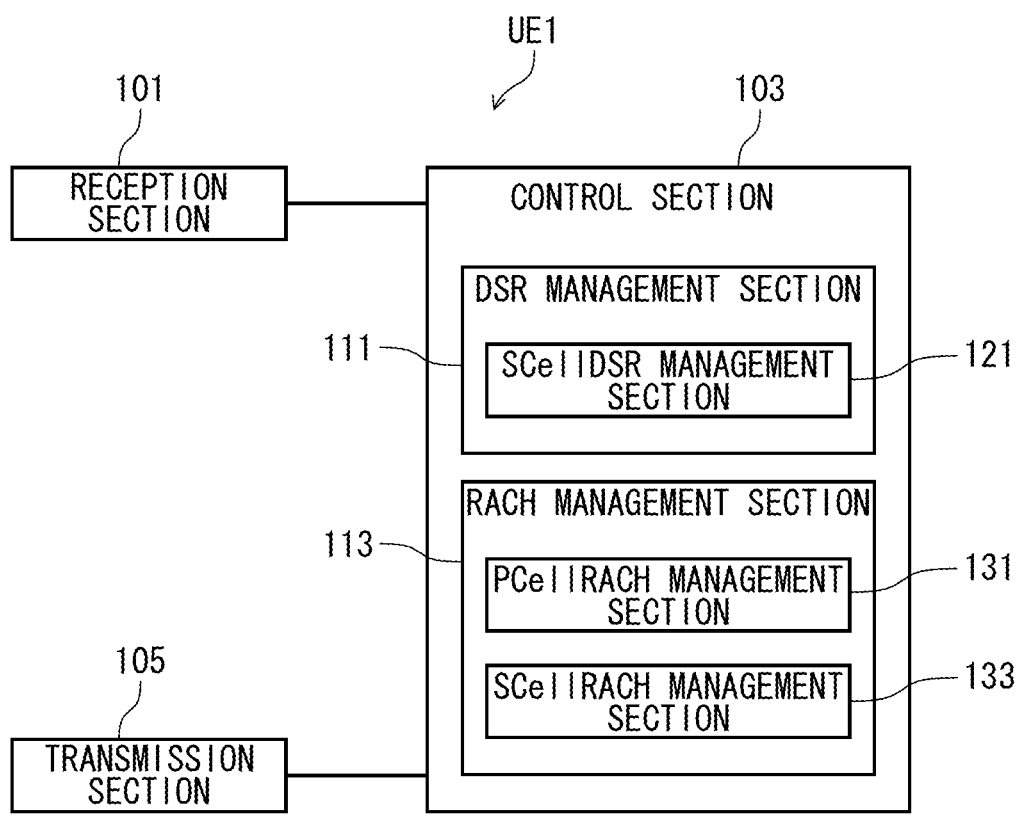
FIG. 5 is a block diagram of the equipment UE1 that makes up the wireless communication system according to the first embodiment.

FIG. 5 is a block diagram of the equipment UE1 that makes up the wireless communication system according to the first embodiment. As illustrated in FIG. 5, the equipment UE1 according to the first embodiment includes a reception section 101, a control section 103, and a transmission section 105. The control section 103 includes a DSR management section 111 and a RACH management section 113. The DSR management section 111 includes a SCellDSR management section 121. The RACH management section 113 includes a PCellRACH management section 131 and a SCellRACH management section 133.

According to an instruction from the control section 103, the reception section 101 receives the control information, such as report information or the dedicated control information, via a downlink of a cell to which the equipment UE1 is connected. The reception section 101 outputs the received control information to the control section 103. Furthermore, the reception section 101 receives the random access response. The reception section 101 outputs the received random access response to the RACH management section 113 of the control section 103. Moreover, the reception section 101 receives a contention resolution message. The reception section 101 outputs the received contention resolution message to the control section 103. Moreover, the random access response received by the reception section 101, although transmitted from the wireless communication device NE11, may be transmitted from the wireless communication device NE12.

The control section 103 instructs the reception section 101 to receive the control information, such as the report information or the dedicated control information. The control information received by the reception section 101 is input into the control section 103. Information relating to a random access channel configuration (RACH config) that is included in the control information that is input into the control section 103 is input into the RACH management section 113 of the control section 103. Furthermore, the configuration information on the dedicated scheduling request resource that is included in the control information that is input into the control section 103 is input into the DSR management section 111 of the control section 103. Based on a state of the equipment UE1 and on the control information, the control section 103 instructs the DSR management section 111 to release the dedicated scheduling request resource.

If the uplink resource is not granted to the equipment UE1, when the uplink data occurs in the equipment UE1 and thus is available for transmission, the control section 103 instructs the DSR management section 111 to transmit the scheduling request (SR). Moreover, after instructing the DSR management section 111 to transmit the scheduling request, when the uplink resource is granted to the equipment UE1, the control section 103 notifies the DSR management section 111 that the uplink resource is granted. Furthermore, when notified by the DSR management section 111 that the scheduling request cannot be transmitted, the control section 103 instructs the RACH management section 113 to start the random access procedure.

When information necessary for transmitting the uplink data is input, which is included in the random access response obtained from the RACH management section 113, the control section 103 instructs the transmission section 105 to transmit the uplink data that is desired to be transmitted, using the designated uplink. Furthermore, when information necessary for transmitting the corresponding uplink data that is included in the random access response obtained from the RACH management section 113 and information indicating that the contention resolution is necessary are input, the control section 103 creates a message (message 3) based on these items of information and thus outputs the corresponding message to the transmission section 105.

If the reception section 101 receives the contention resolution message, the control section 103 outputs the corresponding message, which is input from the reception section 101, to the RACH management section 113. On the other hand, if the reception section 101 does not receive the contention resolution message, the control section 103 instructs the RACH management section 113 to re-transmit the random access preamble. When notified by the RACH management section 113 that the random access procedure fails, the control section 103 starts a re-establishment procedure.

The constituent elements included in the control section 103 are described below in the following sequence: the DSR management section 111, RACH management section 113.

The DSR management section 111 included in the control section 103 manages the configuration information on the dedicated scheduling request resource that is input from the control section 103. Moreover, the configuration information on the dedicated scheduling request resource includes the dedicated scheduling request resources (sr-PUUCCH-ResourceIndex, sr-ConfigIndex, and sr-PUCCH-ResourceIndex P1-r10), and the maximum possible number of times for transmission (dsr-Trans) of the scheduling request (SR) that uses the dedicated scheduling request resource, and so forth. Furthermore, the DSR management section 111 performs the release of a current configuration relating to the dedicated scheduling request resource that is designated by the control section 103.

The DSR management section 111, when requested by the control section 103 to transmit the scheduling request, instructs the SCellDSR management section 121 of the DSR management section 111 to transmit the scheduling request. In this case, if the dedicated scheduling request resource that is input from the control section 103 is the dedicated scheduling request resource of SCell, the DSR management section 111 outputs the configuration information on the dedicated scheduling request resource to the SCellDSR management section 121. After instructing the SCellDSR management section 121 to transmit the scheduling request, when notified from the control section 103 that the uplink resource is granted to the equipment UE1, the DSR management section 111 notifies the SCellDSR management section 121 that the uplink resource is granted.

When being notified by the SCellDSR management section 121 that the dedicated scheduling request resource is not set, and when determining that the equipment UE1 is in a state where the equipment UE1 cannot transmit the scheduling request, the DSR management section 111 notifies the control section 103 that the scheduling request cannot be transmitted. Furthermore, when being notified by the SCellDSR management section 121 that the scheduling request fails to be transmitted and when determining that the equipment UE1 is in the state where the equipment UE1 cannot transmit the scheduling request, the DSR management section 111 notifies the control section 103 that the scheduling request cannot be transmitted.

When instructed by the control section 103 to release the current configuration of the dedicated scheduling request resource relating to SCell, the DSR management section 111 instructs the SCellDSR management section 121 to release the configuration of the dedicated scheduling request resource.

When instructed by the DSR management section 111 to transmit the scheduling request, the SCellDSR management section 121 included in the DSR management section 111 generates the scheduling request. Moreover, the SCellDSR management section 121 instructs the transmission section 105 to transmit the scheduling request at a timing that is based on the configuration information on the dedicated scheduling request resource. However, if the dedicated scheduling request resource is not set, the SCellDSR management section 121 notifies the DSR management section 111 that the dedicated scheduling request resource is not set.

When notified by the DSR management section 111 that the uplink resource is granted to the equipment UE1, the SCellDSR management section 121 stops an instruction to transmit the scheduling request. On the other hand, although the number of times for transmission of the scheduling request reaches the maximum possible number of times of transmission (dsr-Trans), if there is no notification of grant of the uplink resource, the SCellDSR management section 121 notifies the DSR management section 111 that the scheduling request fails. In this case, the SCellDSR management section 121 releases the dedicated scheduling request resource that is set.

Among the random access channel configurations (RACH config) that are input from the control section 103, the RACH management section 113 included in the control section 103 outputs a SCell random access channel configuration to the SCellRACH management section 133 and outputs a PCell random access channel configuration to the PCellRACH management section 131. When instructed by the control section 103 to start the random access procedure, the RACH management section 113 determines which one of the PCellRACH management section 131 and the SCellRACH management section 133 is instructed to start the random access procedure. If the SCell random access channel configuration is set in the SCellRACH management section 133, the RACH management section 113 determines that the random access procedure is started in SCell.

Moreover, only if the dedicated control information that the random access procedure in which the equipment plays a leading role in SCell is permitted is input, the RACH management section 113 may determine that the random access procedure is started in SCell. In this case, the equipment UE1 can prevent the random access procedure from being performed arbitrarily in SCell.

When determining that the random access procedure is started in SCell, the RACH management section 113 instructs the SCellRACH management section 133 to start the random access procedure. After the SCellRACH management section 133 is instructed to start the random access procedure, when the random access response is input from the reception section 101, the RACH management section 113 outputs such random access response to the SCellRACH management section 133.

When notified by the SCellRACH management section 133 of the information necessary for transmitting the uplink data included in the random access response and success of the random access procedure, the RACH management section 113 outputs the information necessary for transmitting the uplink data and the success of the random access procedure to the control section 103.

When notified by the SCellRACH management section 133 of the information necessary for transmitting the uplink data included in the random access response and information indicating that the contention resolution is necessary, the RACH management section 113 outputs the information necessary for transmitting the uplink data and the information indicating that the contention resolution is necessary, to the control section 103. Furthermore, in this state, when instructed by the control section 103 to re-transmit the random access preamble, the RACH management section 113 instructs the SCellRACH management section 133 to re-transmit the random access preamble. In the same manner, in this state, when notified by the control section 103 that the reception section 101 receives the contention resolution message, the RACH management section 113 outputs a notification that the reception section 101 receives the contention resolution message, to the SCellRACH management section 133.

When notified by the SCellRACH management section 133 that the random access procedure fails, the RACH management section 113 notifies the PCellRACH management section 131 that the PCellRACH management section 131 has to start the random access procedure. Furthermore, when determining that the random access procedure in which the equipment plays a leading role cannot be started in SCell, the RACH management section 113 notifies the PCellRACH management section 131 that the PCellRACH management section 131 has to start the random access procedure. After the PCellRACH management section 131 is instructed to start the random access procedure, when the random access response is input from the reception section 101, the RACH management section 113 outputs that random access response to the PCellRACH management section 131.

When notified by the PCellRACH management section 131 of the information necessary for transmitting the uplink data included in the random access response and the success of the random access procedure, the RACH management section 113 outputs the information necessary for transmitting the uplink data and the success of the random access procedure, to the control section 103.

When the information necessary for transmitting the uplink data included in the random access response and the information indicating that the contention resolution is necessary are input from the PCellRACH management section 131, the RACH management section 113 outputs the information necessary for transmitting the uplink data and the information indicating that the contention resolution is necessary, to the control section 103. Furthermore, in this state, when instructed by the control section 103 to re-transmit the random access preamble, the RACH management section 113 instructs the PCellRACH management section 131 to re-transmit the random access preamble. In the same manner, in this state, when notified by the control section 103 that the reception section 101 receives the contention resolution message, the RACH management section 113 outputs a notification that the reception section 101 receives the contention resolution message, to the PCellRACH management section 131.

The SCellRACH management section 133 included in the RACH management section 113 manages the SCell random access channel configuration that is input from the RACH management section 113.

The SCellRACH management section 133 starts the random access procedure according to the instruction from the RACH management section 113. At this time, the SCellRACH management section 133 generates the random access preamble and thus outputs the generated random access preamble to the transmission section 105. Furthermore, after the random access preamble is transmitted, when the random access response is not input from the RACH management section 113, the SCellRACH management section 133 generates the random access preamble for re-transmission and thus outputs the generated random access preamble to the transmission section 105.

When the random access response is input from the RACH management section 113, the SCellRACH management section 133 performs a contention resolution operation whenever necessary. When determining that the contention resolution is not necessary, the SCellRACH management section 133 notifies the RACH management section 113 of the information necessary for transmitting the uplink included in the random access response and the success of the random access procedure and thus terminates the random access procedure. On the other hand, when determining that the contention resolution is necessary, the SCellRACH management section 133 notifies the RACH management section 113 of the information necessary for transmitting the uplink included in the random access response and the information indicating that the contention resolution is necessary.

Furthermore, when instructed by the RACH management section 113 to re-transmit the random access preamble, the SCellRACH management section 133 generates the random access preamble for re-transmission and thus outputs the generated random access preamble to the transmission section 105. When notified by the RACH management section 113 that the reception section 101 receives the contention resolution message, the SCellRACH management section 133 terminates the random access procedure. After the number of times of transmission of the random access preamble reaches the maximum number of times of transmission (preambleTransMax), if the random access response is input from the RACH management section 113, the SCellRACH management section 133 notifies the RACH management section 113 that the random access procedure fails and thus terminates the random access procedure.

The PCellRACH management section 131 included in the RACH management section 113 manages the PCell random access channel configuration that is input from the RACH management section 113.

The PCellRACH management section 131 starts the random access procedure according to the instruction from the RACH management section 113. At this time, the PCellRACH management section 131 generates the random access preamble and thus outputs the generated random access preamble to the transmission section 105. Furthermore, after the random access preamble is transmitted, when the random access response is not input from the RACH management section 113, the PCellRACH management section 131 generates the random access preamble for re-transmission and thus outputs the generated random access preamble to the transmission section 105.

When the random access response is input from the RACH management section 113, the PCellRACH management section 131 performs the contention resolution operation whenever necessary. When determining that the contention resolution is not necessary, the PCellRACH management section 131 notifies the RACH management section 113 of the information necessary for transmitting the uplink included in the random access response and the success of the random access procedure and thus terminates the random access procedure. On the other hand, when determining that the contention resolution is necessary, the PCellRACH management section 131 notifies the RACH management section 113 of the information necessary for transmitting the uplink included in the random access response and the information indicating that the contention resolution is necessary.

When instructed by the RACH management section 113 to re-transmit the random access preamble, the PCellRACH management section 131 generates the random access preamble for re-transmission and thus outputs the generated random access preamble to the transmission section 105. When notified by the RACH management section 113 that the reception section 101 receives the contention resolution message, the PCellRACH management section 131 terminates the random access procedure. After the number of times of transmission for the random access preamble reaches the maximum number of times of transmission (preambleTransMax), if the random access response is not input from the RACH management section 113, the PCellRACH management section 131 notifies the RACH management section 113 that the random access procedure fails and thus terminates the random access procedure.

The transmission section 105 transmits the random access preamble, the scheduling request (SR), a response to a control signal, or the uplink data, to the wireless communication devices NE11 and NE12.

Moreover, if the dedicated scheduling request resource is set for PCell, the equipment UE1 performs the scheduling request using the dedicated scheduling resource of PCell. In this case, although the number of times of transmission of the scheduling request that uses the dedicated scheduling request resource reaches the maximum number of times of transmission, if the uplink resource is not granted, the equipment UE1 starts the random access procedure in PCell.

Moreover, the dedicated control information may include one-bit information that indicates whether or not the random access procedure that uses SCell for the scheduling request is available. The one-bit information may be information that indicates whether or not the random access procedure in which the equipment plays a leading role is permitted in SCell. In this case, based on the one-bit information, the RACH management section 113 of the equipment UE1 determines which one of the SCellRACH management section 133 and the PCellRACH management section 131 is notified of starting of the random access procedure.

[Configuration of the Wireless Communication Device NE11 According to the First Embodiment]

Figure 6:
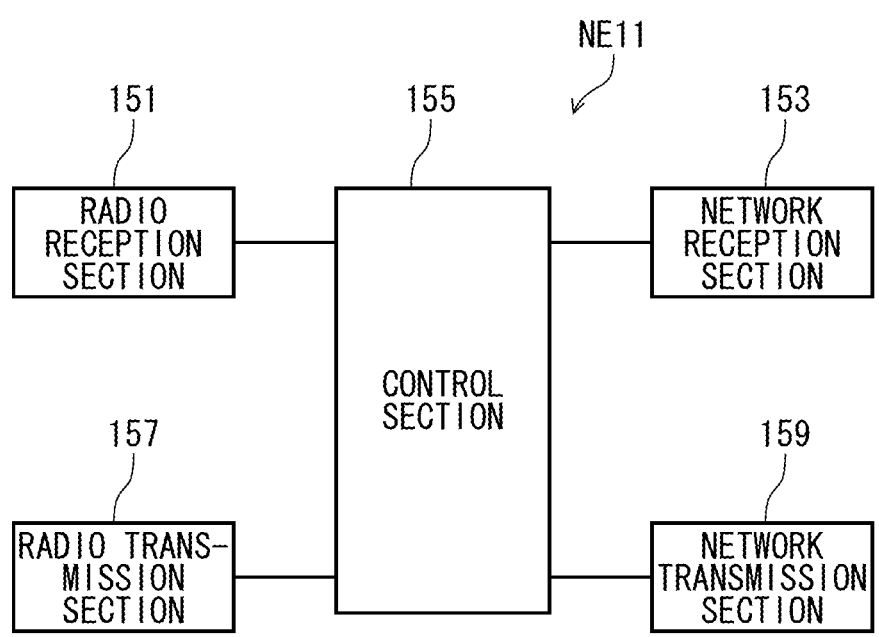
FIG. 6 is a block diagram of the wireless communication device NE11 that makes up the wireless communication system according to the first embodiment.

FIG. 6 is a block diagram of the wireless communication device NE11 that makes up the wireless communication system according to the first embodiment. As illustrated in FIG. 6, the wireless communication device NE11 according to the first embodiment includes a radio reception section 151, a network reception section 153, a control section 155, a radio transmission section 157, and a network transmission section 159.

The radio reception section 151 receives the random access preamble that is transmitted from the equipment UE1, the scheduling request (SR), the response to the control signal, or the uplink data, and thus outputs the received one of these to the control section 155. When a message relating to the control information is input from the wireless communication device NE12, the network reception section 153 outputs the message that is input, to the control section 155.

The control section 155 determines whether or not the dedicated scheduling request resource is granted to the equipment UE1. When determining that the dedicated scheduling request resource is granted, the control section 155 determines whether the corresponding resource is set for SCell or is set for PCell. When determining that the dedicated scheduling request resource is granted to SCell, the control section 155 creates the configuration information on the dedicated scheduling request resource of SCell. The control section 155 outputs the configuration information on the dedicated scheduling request resource of SCell to the network transmission section 159 so that the configuration information on the dedicated scheduling request resource of SCell is transmitted to the wireless communication device NE12 that manages SCell.

Furthermore, the control section 155 determines whether or not the random access procedure is permitted in SCell and when determining that the random access procedure is permitted in SCell, creates the SCell random access channel configuration. Because the SCell random access channel configuration is checked in the wireless communication device NE12 that manages SCell if necessary, the control section 155 may output the SCell random access channel configuration to the network transmission section 159 so that the SCell random access channel configuration is transmitted to the wireless communication device NE12. If the SCell random access channel configuration is not output to the network transmission section 159, the control section 155 outputs the SCell random access channel configuration to the radio transmission section 157.

Moreover, one-bit information that indicates whether or not the use for the scheduling request is permitted may be added to the random access channel configuration. This is because although the random access procedure for the scheduling request in SCell is not permitted, there is a case where the notification of the SCell random access channel configuration is given. The one-bit information may be information that indicates whether or not the random access procedure in which the equipment plays a leading role is permitted.

The message relating to the control information that is obtained from the wireless communication device NE12 is input from the network reception section 153 into the control section 155. The control section 155 outputs the configuration information on the dedicated scheduling request resource of SCell to the radio transmission section 157 when the wireless communication device NE12 accepts the configuration information on the dedicated scheduling request resource of SCell with a confirmation response relating to a configuration of the dedicated scheduling request resource of SCell. Furthermore, when receiving the updated configuration information on the dedicated scheduling request resource of SCell from the wireless communication device NE12, the control section 155 outputs the corresponding received configuration information to the radio transmission section 157. Furthermore, when notified by the wireless communication device NE12 that the dedicated scheduling request resource cannot be set for SCell, the control section 155 determines whether or not the dedicated scheduling request resource is set for PCell.

Furthermore, the control section 155 outputs the SCell random access channel configuration to the radio transmission section 157 when the network reception section 153 accepts the SCell random access channel configuration with the confirmation response to the SCell random access channel configuration that is input. Furthermore, the control section 155 outputs the updated random access channel configuration that is input from the network reception section 153, to the radio transmission section 157. Furthermore, when notified by the network transmission section 159 that the random access procedure in SCell cannot be accepted, the control section 155 performs control in such a manner that the random access procedure in SCell is not transmitted to the equipment UE1.

When determining that the dedicated scheduling request resource is granted to PCell, the control section 155 creates the configuration information on the dedicated scheduling request resource of PCell and thus outputs the created configuration information to the radio transmission section 157. Furthermore, the control section 155 creates the configuration information on a PCell random access procedure and thus outputs the created configuration information to the radio transmission section 157.

When the scheduling request received by the radio reception section 151 from the equipment UE1 is input, the control section 155 sets the uplink resource for the equipment UE1. When the random access preamble received by the radio reception section 151 from the equipment UE1 is input, the control section 155 generates the random access response and thus outputs the generated random access response to the radio transmission section 157. When the random access response is input from the network reception section 153, the control section 155 outputs the random access response that is input, to the radio transmission section 157.

The radio transmission section 157 transmits data that is input from the control section 155, the report information, the dedicated control information, or the random access response, to the equipment UE1. The network transmission section 159 transmits the control information that is input from the control section 155, to the wireless communication device NE12.

[Configuration of the Wireless Communication Device NE12 According to the First Embodiment]

Figure 7:
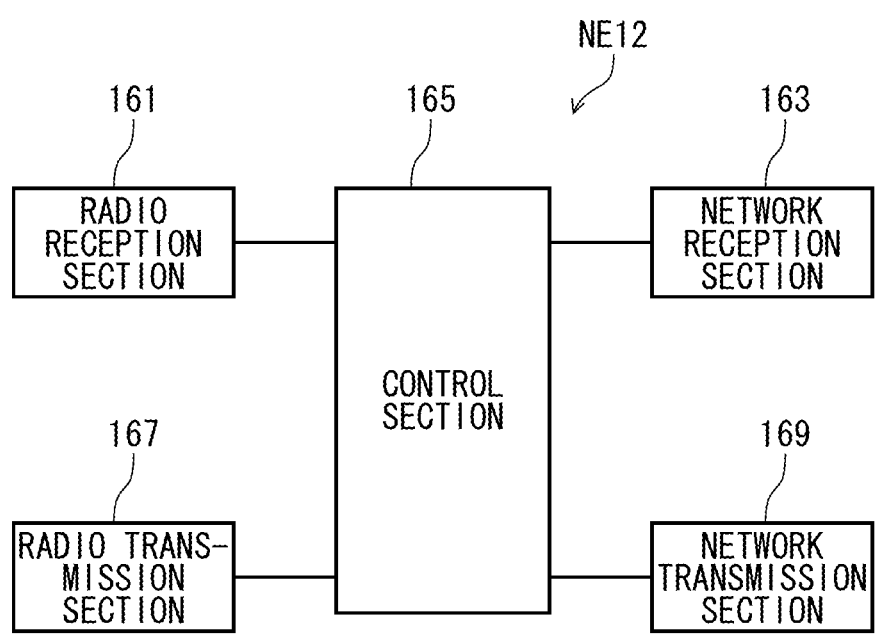
FIG. 7 is a block diagram of the wireless communication device NE12 that makes up the wireless communication system according to the first embodiment.

FIG. 7 is a block diagram of the wireless communication device NE12 that makes up the wireless communication system according to the first embodiment. As illustrated in FIG. 7, the wireless communication device NE12 according to the first embodiment includes a radio reception section 161, a network reception section 163, a control section 165, a radio transmission section 167, and the network transmission section 169.

The radio reception section 161 receives the random access preamble that is transmitted from the equipment UE1, the scheduling request (SR), the response to the control signal, or the uplink data and thus outputs the received one of these to the control section 165. When a message relating to the control information is input from the wireless communication device NE11, the network reception section 163 outputs the message that is input, to the control section 165.

When receiving the configuration information on the dedicated scheduling request resource from the network reception section 163 with respect to the equipment UE1, the control section 165 determines whether or not the configuration information on the corresponding dedicated scheduling request resource is accepted. When determining that the configuration information on the corresponding dedicated scheduling request resource is accepted, the control section 165 outputs a notification to that effect to the network transmission section 169. When determining that the dedicated scheduling request resource, different from the configuration information on the corresponding dedicated scheduling request resource, is granted, the control section 165 updates the configuration information on the dedicated scheduling request resource and outputs the updated configuration information on the dedicated scheduling request resource to the network transmission section 169. When determining that the dedicated scheduling request resource is not set for the equipment UE1, the control section 165 outputs a notification to that effect to the network transmission section 169.

When receiving the SCell random access channel configuration from the network reception section 163 with respect to the equipment UE1, the control section 165 determines whether or not the corresponding random access channel configuration is accepted. When determining that the corresponding random access channel configuration is accepted, the control section 165 outputs a notification to that effect to the network transmission section 169. When determining that the notification of the random access channel configuration, different from the corresponding random access channel configuration, is given, the control section 165 updates the random access channel configuration and outputs the updated random access channel configuration to the network transmission section 169. When determining that the random access procedure in SCell for the scheduling request between the control section 165 and the equipment UE1 is not accepted, the control section 165 outputs a notification to that effect to the network transmission section 169.

When the scheduling request received by the radio reception section 161 from the equipment UE1 is input, the control section 165 sets the uplink source for the equipment UE1 and thus outputs the granted uplink source to the radio transmission section 167. Moreover, when the scheduling request is input from the radio reception section 161, the control section 165 may output the scheduling request to the network transmission section 169 in order to notify the wireless communication device NE11 of the scheduling request.

When the random access preamble received by the radio reception section 161 from the equipment UE1 is input, the control section 165 generates the random access response and thus outputs the generated random access response to the radio transmission section 167. When the random access preamble from the equipment UE1 is input from the radio reception section 161, the control section 165 generates the random access response and thus may output the generated random access response to the wireless communication device NE11.

The radio transmission section 167 transmits data that is input from the control section 165, the report information, the dedicated control information, or the random access response, to the equipment UE1. The network transmission section 169 transmits the control information that is input from the control section 165, to the wireless communication device NE11.

(Operation of the Equipment UE1 According to the First Embodiment)

Figure 8:
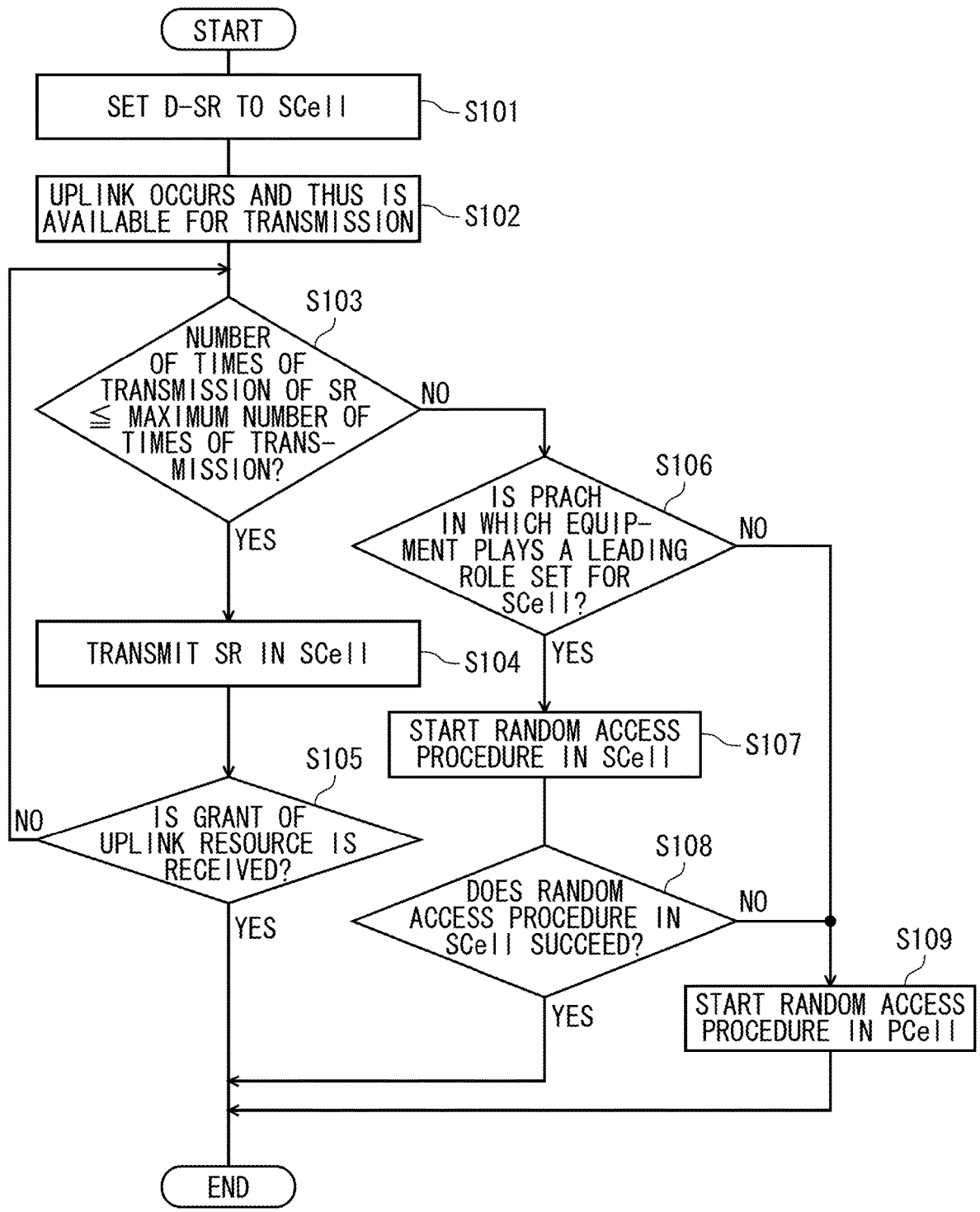
FIG. 8 is a flow chart illustrating operation of the equipment UE1 in the case where, in the state where the uplink resource is not granted to the equipment UE1, the uplink data occurs in the equipment UE1 and thus is available for transmission, in the wireless communication system according to the first embodiment.

Operation of the equipment UE1 in the case where, in a state where the uplink resource is not granted to the equipment UE1, the uplink data occurs in the equipment UE1 and thus is available for transmission is described below referring to FIG. 8. FIG. 8 is a flow chart illustrating the operation of the equipment UE1 in the case where, in the state where the uplink resource is not granted to the equipment UE1 the uplink data occurs in the equipment UE1 and thus is available for transmission, in the wireless communication system according to the first embodiment.

As illustrated in FIG. 8, the dedicated scheduling request resource (D-SR) in SCell is set for the equipment UE1 (Step S101). Next, when in the state where the uplink is not granted the uplink data occurs and thus is available for transmission (Step S102), the equipment UE1 proceeds to Step S103.

In Step S103, the equipment UE1 determines whether or not the number of times of transmission of the scheduling request that uses the dedicated scheduling request resource exceeds the maximum number of times of transmission (the number of times of transmission of the scheduling request-≤the maximum number of times of transmission). If the number of times of transmission of the scheduling request that uses the dedicated scheduling request resource does not exceed the maximum number of times of transmission (Yes in S103), the equipment UE1 proceeds to Step S104. If the number of times of transmission of the scheduling request that uses the dedicated scheduling request resource exceeds the maximum number of times of transmission (No in S103), the equipment UE1 proceeds to Step S106.

In Step S104, the equipment UE1 transmits the scheduling request to the wireless communication device NE12 using the dedicated scheduling request resource of SCell. Next, the equipment UE1 determines whether or not the grant of the uplink resource is received (Step S105). If the uplink resource is granted, the equipment UE1 terminates a sequence of processing steps. If the uplink resource is not granted, the equipment UE1 returns to Step S103.

In Step S106, the equipment UE1 determines whether the starting of the random access procedure in which the equipment plays a leading role in SCell is permitted and whether or not the PRACH resource is set for SCell. If it is determined that the PRACH resource for starting the random access procedure in which the equipment plays a leading role is set for SCell, the equipment UE1 proceeds to Step S107. If the PRACH resource for starting the random access procedure in which the equipment plays a leading role is determined not to be set for SCell, the equipment UE1 proceeds to Step S109.

In Step S107, the equipment UE1 starts the random access procedure in SCell. Next, the equipment UE1 determines whether or not the random access procedure in SCell succeeds (Step S108). If the random access procedure in SCell is determined to succeed, the equipment UE 1 terminates a sequence of processing steps. If the random access procedure in SCell is determined to fail, the equipment UE1 proceeds to Step S109.

In Step S109, the equipment UE1 starts the random access procedure in PCell. Moreover, if the random access procedure in PCell fails, the equipment UE1 starts a re-connection procedure.

As illustrated above, according to the present embodiment, power consumption by the equipment UE1 can be reduced when transmitting the scheduling request, because the equipment UE1 transmits the scheduling request to the wireless communication device NE12 that is smaller in propagation loss than the wireless communication device NE11. Furthermore, because the equipment UE1 transmits the random access preamble to the wireless communication device NE12 if the uplink resource is not granted although the scheduling request is performed, power consumption can be reduced when transmitting the random access preamble.

Second Embodiment

A wireless communication system according to a second embodiment is described referring to FIG. 9 to FIG. 12. The wireless communication system according to the second embodiment is different from the wireless communication system according to the first embodiment in that although the equipment performs the scheduling request in SCell, if the uplink resource is not granted, the corresponding equipment starts the random access procedure in PCell without performing the random access procedure in SCell. In other respects, the second embodiment is the same as the first embodiment.

Figure 9:
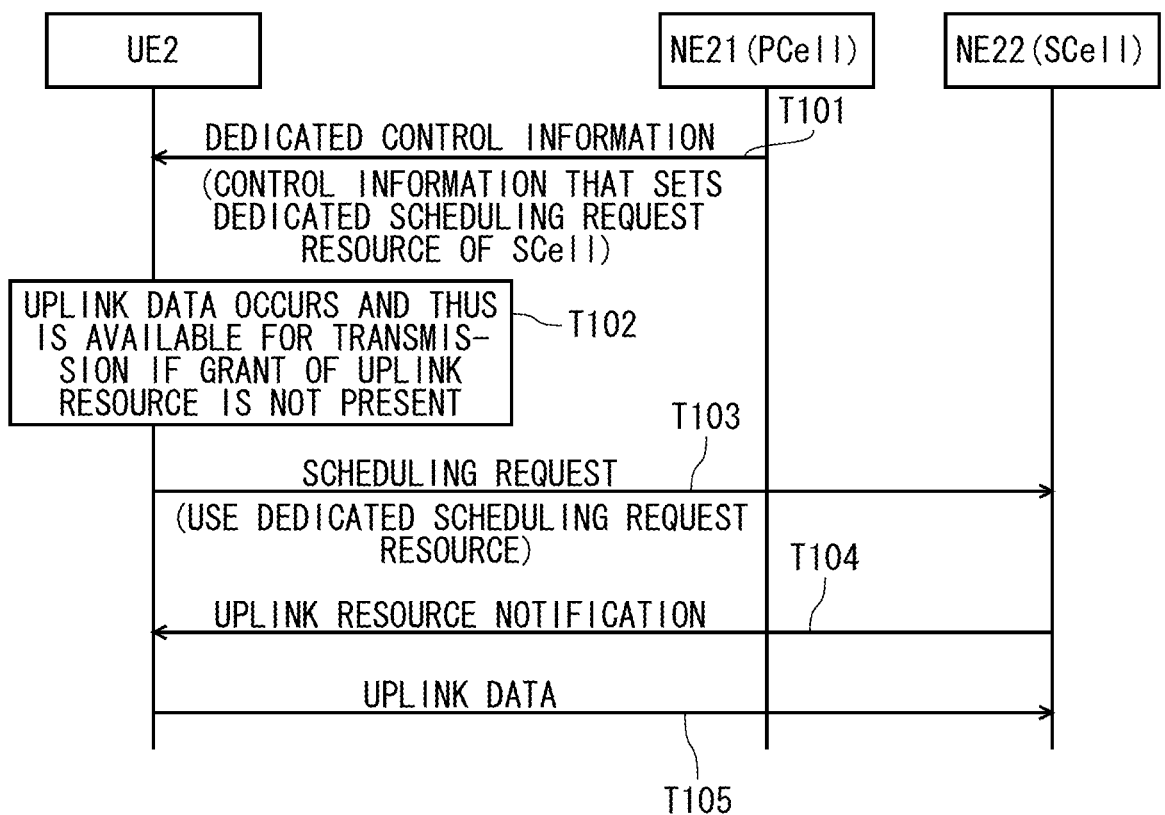
FIG. 9 is a diagram illustrating an example of a timing chart that includes processing between equipment UE2 and the wireless communication devices NE21 and NE22 in a wireless communication system according to a second embodiment.
Figure 10:
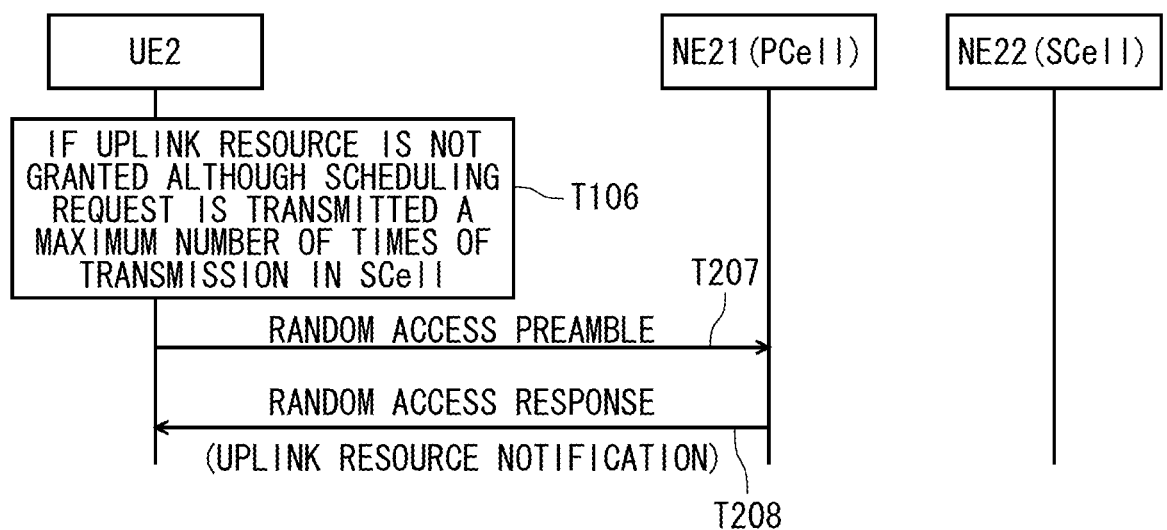
FIG. 10 is a diagram illustrating one example of a timing chart that includes processing performed between the equipment UE2 and the wireless communication device NE21 if the uplink resource is not granted although the equipment UE2 performs the scheduling request.

FIG. 9 and FIG. 10 are diagrams illustrating an example of a timing chart that includes processing between equipment UE2 and wireless communication devices NE21 and NE22 in the wireless communication system according to the second embodiment. Moreover, in FIG. 9 and FIG. 10, like reference numerals are given to the same processing or the same data as the processing or as the data in the first embodiment, illustrated in FIG. 2 and FIG. 3. Furthermore, the equipment UE2 is equal to the equipment UE illustrated in FIG. 1, the wireless communication device NE21 is equal to the wireless communication device NE1 illustrated in FIG. 1 and the wireless communication device NE11 according to the first embodiment, and the wireless communication device NE22 is equal to the wireless communication device NE2 illustrated in FIG. 1 and the wireless communication device NE12 according to the first embodiment. Furthermore, carrier aggregation, which uses PCell provided by the wireless communication device NE21 and SCell provided by the wireless communication device NE22 as one component carrier set, is set in the equipment UE2.

Because a timing chart illustrated in FIG. 9 is the same as the timing chart illustrated in FIG. 2, a description of the timing chart in FIG. 9 is omitted. FIG. 10 is a diagram illustrating one example of a timing chart that includes processing performed between the equipment UE2 and the wireless communication device NE21 if the uplink resource is not granted although the equipment UE2 performs the scheduling request. As illustrated in FIG. 10, after the processing T103 illustrated in FIG. 9, although the equipment UE2 transmits the scheduling request to the wireless communication device NE22 up to the maximum number of times of transmission that is set with the control information, if the uplink resource is not granted (T106), the equipment UE2 starts the random access procedure that uses a physical random access channel (PRACH) resource of PCell and transmits a random access preamble to the wireless communication device NE21 (T207). The wireless communication device NE21 creates a random access response that includes a notification of the uplink resource and transmits the created random access response to the equipment UE2 (T208). When receiving the random access response, the equipment UE2 transmits the uplink data to the wireless communication device NE21 using the uplink resource, the notification of which is given by the corresponding random access response.

[Configuration of the Equipment UE2 According to the Second Embodiment]

Figure 11:
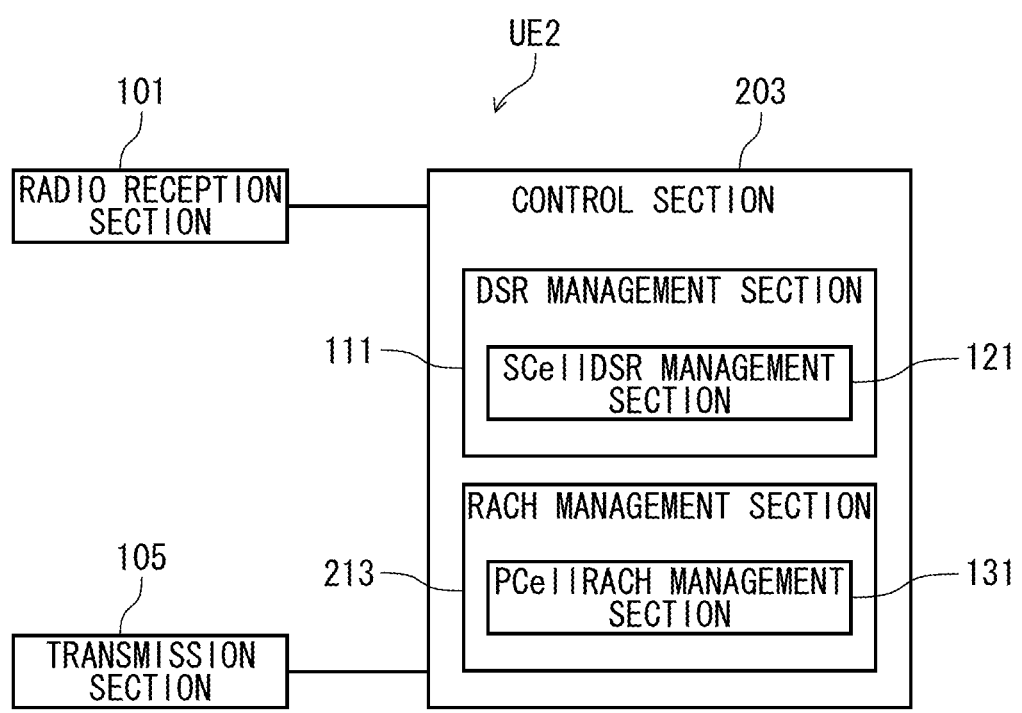
FIG. 11 is a block diagram of the equipment UE2 that makes up the wireless communication system according to the second embodiment.

FIG. 11 is a block diagram of the equipment UE2 that makes up the wireless communication system according to the second embodiment. As illustrated in FIG. 11, the equipment UE2 according to the second embodiment includes the reception section 101, a control section 203, and the transmission section 105. The control section 203 includes a DSR management section 111 and a RACH management section 213. The DSR management section 111 includes the SCellDSR management section 121 in the same manner as in the equipment UE1 according to the first embodiment. The RACH management section 213 includes the PCellRACH management section 131. The equipment UE2 according to the present embodiment is different from the equipment UE1 according to the first embodiment in that the RACH management section 213 of the control section 203 does not include the SCellRACH management section 133. Therefore, the RACH management section 213 according to the present embodiment is described below.

Among the random access channel configurations (RACH config) that are input from the control section 203, the RACH management section 213 outputs the PCell random access channel configuration to the PCellRACH management section 131. When instructed by the control section 203 to start the random access procedure, the RACH management section 213 notifies the PCellRACH management section 131 that the PCellRACH management section 131 has to start the random access procedure. After the PCellRACH management section 131 is instructed to start the random access procedure, when the random access response is input from the reception section 101, the RACH management section 213 outputs that random access response to the PCellRACH management section 131.

When notified by the PCellRACH management section 131 of the information necessary for transmitting the uplink data included in the random access response and success of the random access procedure, the RACH management section 213 outputs the information necessary for transmitting the uplink data and the success of the random access procedure to the control section 203.

When notified by the PCellRACH management section 131 of the information necessary for transmitting the uplink data included in the random access response and the information indicating that the contention resolution is necessary, the RACH management section 213 outputs the information necessary for transmitting the uplink data and the information indicating that the contention resolution is necessary to the control section 203. Furthermore, in this state, when instructed by the control section 203 to re-transmit the random access preamble, the RACH management section 213 instructs the PCellRACH management section 131 to re-transmit the random access preamble. In the same manner, in this state, when notified by the control section 203 that the reception section 101 receives the contention resolution message, the RACH management section 213 outputs a notification that the reception section 101 receives the contention resolution message, to the PCellRACH management section 131.

Moreover, if the dedicated scheduling request resource is set for PCell, the equipment UE2 performs the scheduling request using the dedicated scheduling resource of PCell. In this case, although the number of times of transmission of the scheduling request that uses the dedicated scheduling request resource reaches the maximum number of times of transmission, if the uplink resource is not granted, the equipment UE2 starts the random access procedure in PCell.

(Operation of the Equipment UE2 According to the Second Embodiment)

Figure 12:
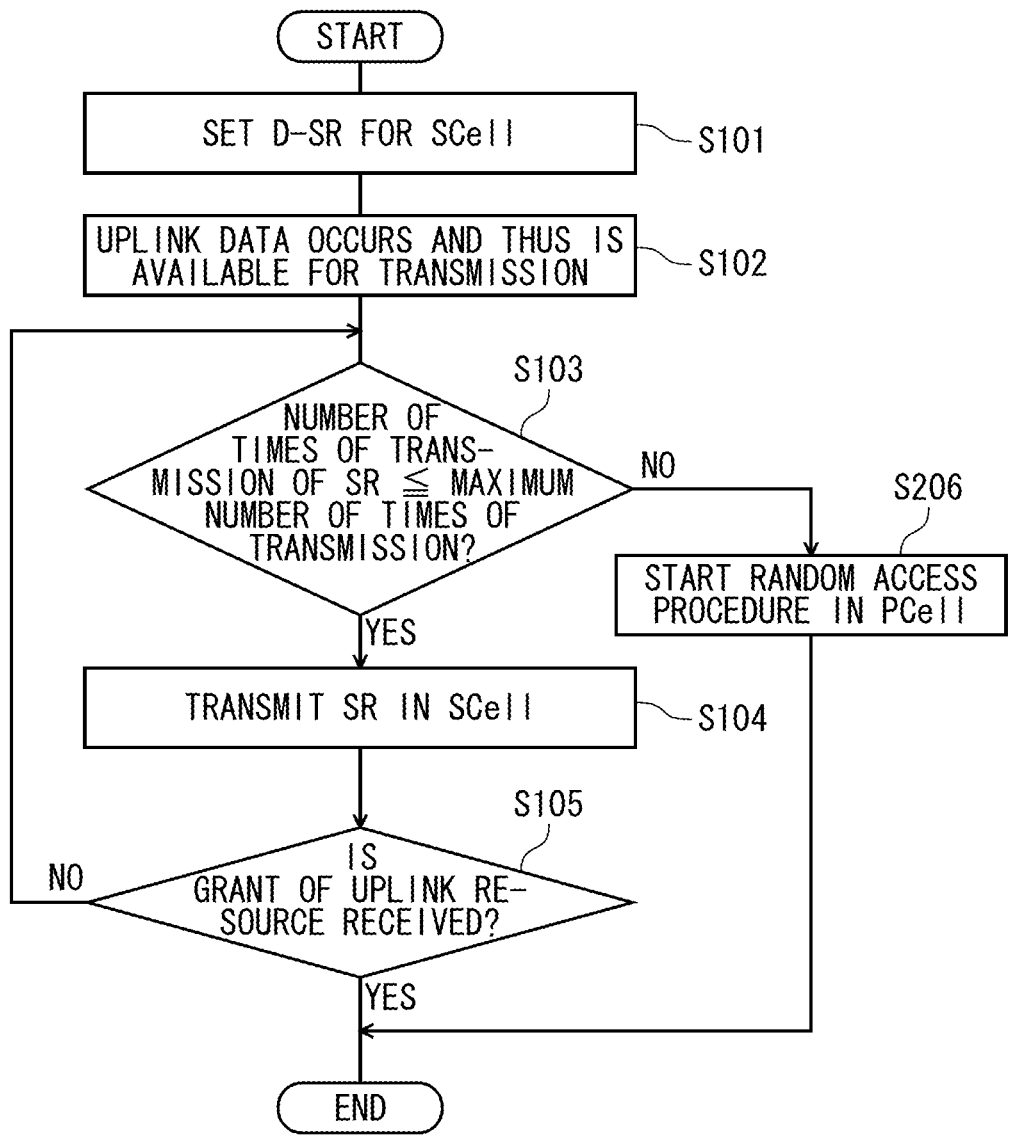
FIG. 12 is a flow chart illustrating operation of the equipment UE2 in the case where, in the state where the uplink resource is not granted to the equipment UE2, the uplink data occurs in the equipment UE2 and thus is available for transmission, in the wireless communication system according to the second embodiment.

Operation of the equipment UE2 in the case where, in a state where the uplink resource is not granted to the equipment UE2, the uplink data occurs in the equipment UE2 and thus is available for transmission is described below referring to FIG. 12. FIG. 12 is a flow chart illustrating the operation of the equipment UE2 in the case where, in the state where the uplink resource is not granted to the equipment UE2 the uplink data occurs in the equipment UE2 and thus is available for transmission, in the wireless communication system according to the second embodiment. Moreover, in FIG. 12, like reference numerals are given to the same steps as the steps in the flowchart according to the first embodiment in FIG. 8.

As illustrated in FIG. 12, the dedicated scheduling request resource (D-SR) in SCell is set for the equipment UE2 (Step S101). Next, when, in the state where the uplink is not granted, the uplink data occurs and thus is available for transmission (Step S102), the equipment UE2 proceeds to Step S103.

In Step S103, the equipment UE2 determines whether or not the number of times of transmission of the scheduling request that uses the dedicated scheduling request resource exceeds the maximum number of times of transmission (the number of times of transmission of the scheduling request the maximum number of times of transmission). If the number of times of transmission of the scheduling request that uses the dedicated scheduling request resource does not exceed the maximum number of times of transmission (Yes in S103), the equipment UE1 proceeds to Step S104. If the number of times of transmission of the scheduling request that uses the dedicated scheduling request resource exceeds the maximum number of times of transmission (No in S103), the equipment UE2 proceeds to Step S206.

In Step S104, the equipment UE2 transmits the scheduling request using the dedicated scheduling request resource of SCell. Next, the equipment UE2 determines whether or not the grant of the uplink resource is received (Step S105). If the uplink resource is granted, the equipment UE2 terminates a sequence of processing steps. If the uplink resource is not granted, the equipment UE2 returns to Step S103.

In Step S206, the equipment UE2 starts the random access procedure in PCell. Moreover, if the random access procedure in PCell fails, the equipment UE2 starts a re-connection procedure.

As illustrated above, according to the present embodiment, power consumption can be reduced when transmitting the scheduling request of the equipment UE2, because the equipment UE2 transmits the scheduling request using the dedicated scheduling request resource of SCell. Furthermore, although the scheduling request is performed in SCell, if the uplink is not granted, the equipment UE2 performs the random access procedure in PCell that is greater in cell coverage than SCell. Therefore, success probability is greater than in the first embodiment in which the random access procedure is performed in SCell. As a result, power consumption and delay time that failure of the random access procedure entails can be prevented from being increased. Furthermore, because the random access procedure that is closed in PCell, an existing technique, is performed, the equipment and the base station can be easily constructed.

Third Embodiment

A wireless communication system according to a third embodiment is described referring to FIG. 13 to FIG. 17. The wireless communication system according to the third embodiment is different from the wireless communication system according to the first embodiment in that the equipment changes the previous wireless communication device that transmits the random access preamble, according to priority of the uplink data that occurs. In other respects, the third embodiment is the same as the first embodiment.

Figure 13:
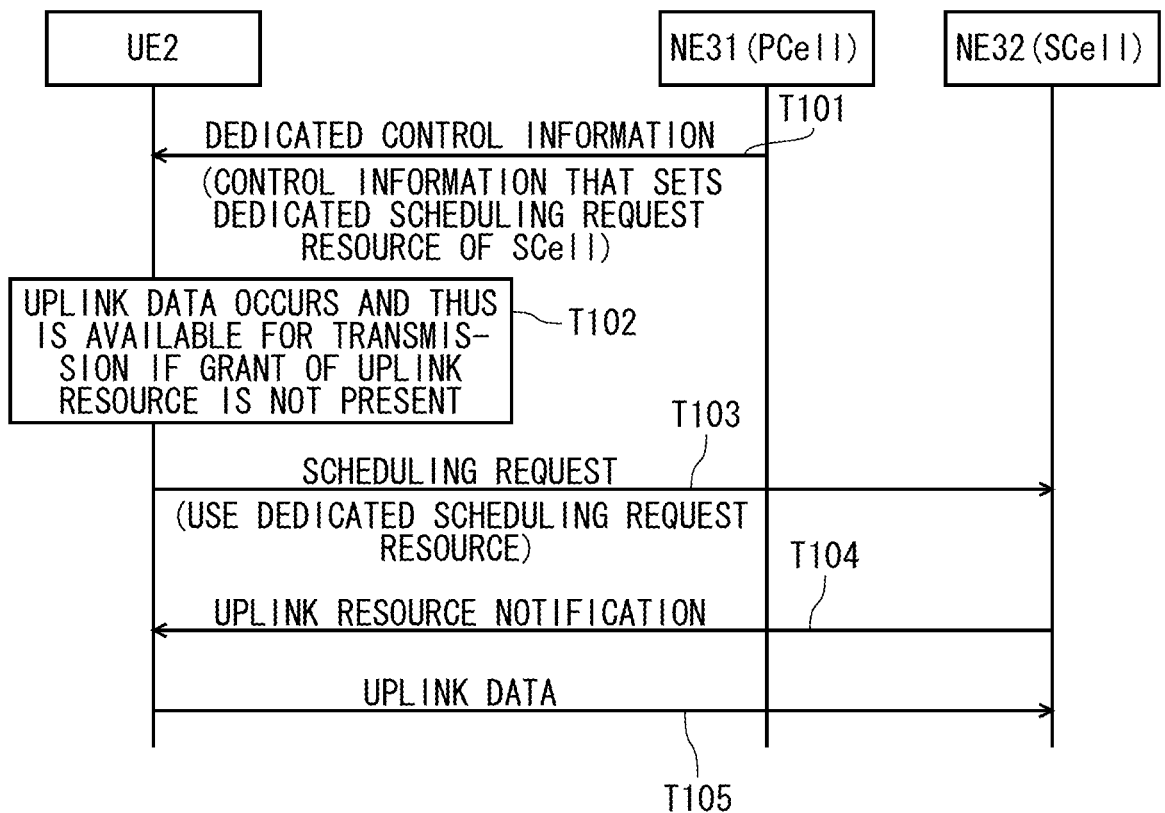
FIG. 13 is a diagram illustrating an example of a timing chart that includes processing between equipment UE3 and wireless communication devices NE31 and NE32 in a wireless communication system according to a third embodiment.
Figure 14:
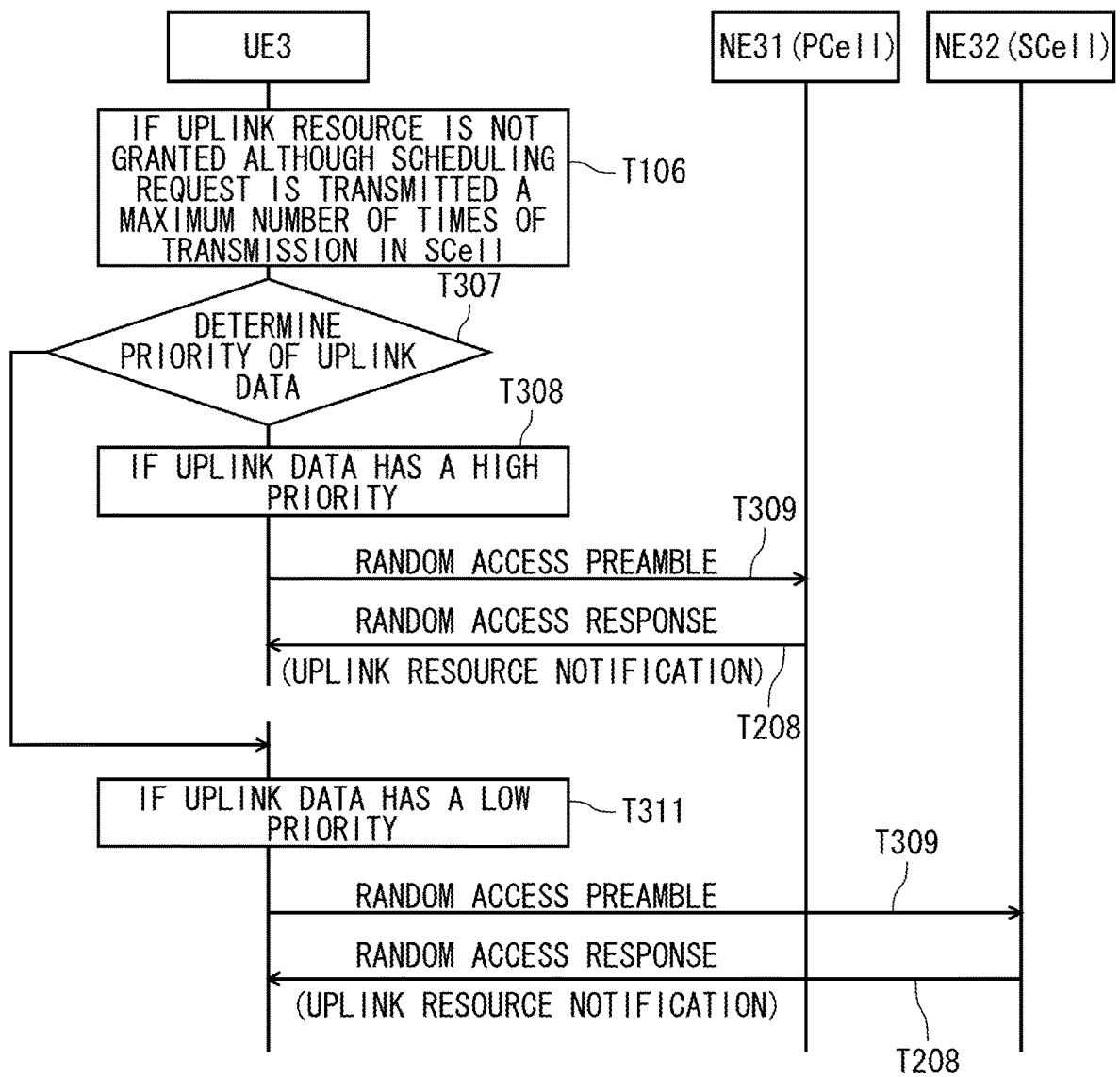
FIG. 14 is a diagram illustrating one example of a timing chart that includes processing performed between the equipment UE3 and the wireless communication device NE31 or the wireless communication device NE32 if the uplink resource is not granted although the equipment UE3 performs the scheduling request.

FIG. 13 and FIG. 14 are diagrams illustrating an example of a timing chart that includes processing between equipment UE3 and wireless communication devices NE31 and NE32 in the wireless communication system according to the third embodiment. Moreover, in FIG. 13 and FIG. 14, like reference numerals are given to the same processing or the same data as the processing or as the data in the first embodiment, illustrated in FIG. 2 and FIG. 3. Furthermore, the equipment UE3 is equal to the equipment UE illustrated in FIG. 1, the wireless communication device NE31 is equal to the wireless communication device NE1 illustrated in FIG. 1 and the wireless communication device NE11 according to the first embodiment, and the wireless communication device NE32 is equal to the wireless communication device NE2 illustrated in FIG. 1 and the wireless communication device NE12 according to the first embodiment. Furthermore, carrier aggregation, which uses PCell provided by the wireless communication device NE31 and SCell provided by the wireless communication device NE32 as one carrier aggregation, is set in the equipment UE3.

Because a timing chart illustrated in FIG. 13 is the same as the timing chart illustrated in FIG. 2, a description of the timing chart in FIG. 13 is omitted. FIG. 14 is a diagram illustrating one example of a timing chart that includes processing performed between the equipment UE3 and the wireless communication device NE31 or the wireless communication device NE32 if the uplink resource is not granted although the equipment UE3 performs the scheduling request. As illustrated in FIG. 14, after the processing T103 illustrated in FIG. 13, although the equipment UE3 transmits the scheduling request to the wireless communication device NE32 up to the maximum number of times of transmission that is set with the control information, if the uplink resource is not granted (T106), the equipment UE3 determines the priority of the uplink data (T307).

If it is determined that the uplink data is of high priority (T308), the equipment UE3 starts the random access procedure using the PRACH (physical random access channel) resource of PCell and thus transmits the random access preamble to the wireless communication device NE31 (T309). The wireless communication device NE31 creates a random access response that includes a notification of the uplink resource and transmits the created random access response to the equipment UE3 (T310). When receiving the random access response, the equipment UE3 transmits the uplink data to the wireless communication device NE31 using the uplink resource, the notification of which is given by the corresponding random access response.

On the other hand, if it determines that the uplink data is of low priority (T311), the equipment UE3 starts the random access procedure using the PRACH (physical random access channel) resource of SCell and thus transmits the random access preamble to the wireless communication device NE32 (T312). The wireless communication device NE32 creates a random access response that includes a notification of the uplink resource and transmits the created random access response to the equipment UE3 (T313). When receiving the random access response, the equipment UE3 transmits the uplink data to the wireless communication device NE32 using the uplink resource, the notification of which is given by the corresponding random access response.

Moreover, when receiving the random access preamble transmitted from equipment UE3 in the processing T312, the wireless communication device NE32 may notify the wireless communication device NE31 that the wireless communication device NE31 receives the random access preamble from the equipment UE3. In this case, the wireless communication device NE31 transmits the random access response to the equipment UE3.

If the random access procedure in SCell fails in the processing T312, the equipment UE3 may perform the random access procedure in PCell as illustrated in FIG. 1C according to the first embodiment.

In processing T307 illustrated in FIG. 14, the equipment UE3's determining whether the uplink data is of high priority or of low priority is performed, based on any one of determination method examples 1 to 7 that are described below. However, the equipment UE3's determination may be based on determination methods other than the determination method examples 1 to 7. Moreover, along with a logical channel that is described in the determination method examples 2 and 3, a bearer that is described in the determination method example 4 is a tunnel that is a virtual communication path along which the data transparently passes via a low-level communication layer.

Determination Method Example 1

The high-priority uplink data is data that cannot be permitted a delay, or data that cannot be permitted the time to the dedicated scheduling request resource that is granted. The low-priority uplink data is data that can be permitted a delay, or data that can be permitted the time it takes to set the dedicated scheduling request resource.

Determination Method Example 2

The high-priority uplink data is data that is transmitted over a specific "logical channel." The low-priority uplink data is data other than data that is transmitted over the specific "logical channel."

Determination Method Example 3

The high-priority uplink data is data that is transmitted over a specific "logical channel group." The low-priority uplink data is data other than data that is transmitted over the specific "logical channel group."

Determination Method Example 4

The high-priority uplink data is data that is transmitted over a specific bearer. The low-priority uplink data is data other than data that is transmitted over the specific bearer.

Determination Method Example 5

The high-priority uplink data is RRC layer control information. The low-priority uplink data is data other than the RRC layer control information.

Determination Method Example 6

The high-priority uplink data is RRC layer control information. The low-priority uplink data is data other than the RRC layer control information.

Determination Method Example 6

The high-priority uplink data is data that relates to mobility control. The low-priority uplink data is data that does not relate to the mobility control.

Determination Method Example 7

The high-priority uplink data is data that occurs when an amount of electricity remaining in a battery, not illustrated, which the equipment UE3 has, is large. The low-priority uplink data is data that occurs when an amount of electricity remaining in the battery in the equipment UE3 is small.

Information necessary for the equipment UE 3 to determine the priority of the uplink data using the determination method described above is set in the equipment UE3 using the following methods.

Determination-Method Setting Example 1

The determination method is set in advance in the equipment UE3. Based on the determination method that is set in advance, the equipment UE3 determines whether the uplink data that occurs is of high priority or of low priority.

Determination-Method Setting Example 2

The determination method is set in advance in the equipment UE3. The wireless communication device NE31 or the wireless communication device NE32 notifies the equipment UE3 of one-bit information that in the case of the low-priority uplink data, the random access procedure in which the equipment plays a leading role is permitted in SCell is allowed, by using the dedicated control information. If such information is set, the equipment UE3 determines whether the uplink data is of high priority or of low priority, based on the determination method that is set in advance.

Determination-Method Setting Example 3

The equipment UE3 is notified by the wireless communication device NE31 or the wireless communication device NE32 of the determination method, using the dedicated control information. Based on the determination method, the notification of which is given, the equipment UE3 determines whether the uplink data that occurs is of high priority or of low priority. Moreover, the dedicated control information may be a RRC message or may be a MAC message.

Moreover, the determination-method setting example described above is one example, and the information for determining the priority of the uplink data may be set using methods other than the determination-method setting examples described above.

[Configuration of the Equipment UE3 According to the Third Embodiment]

Figure 15:
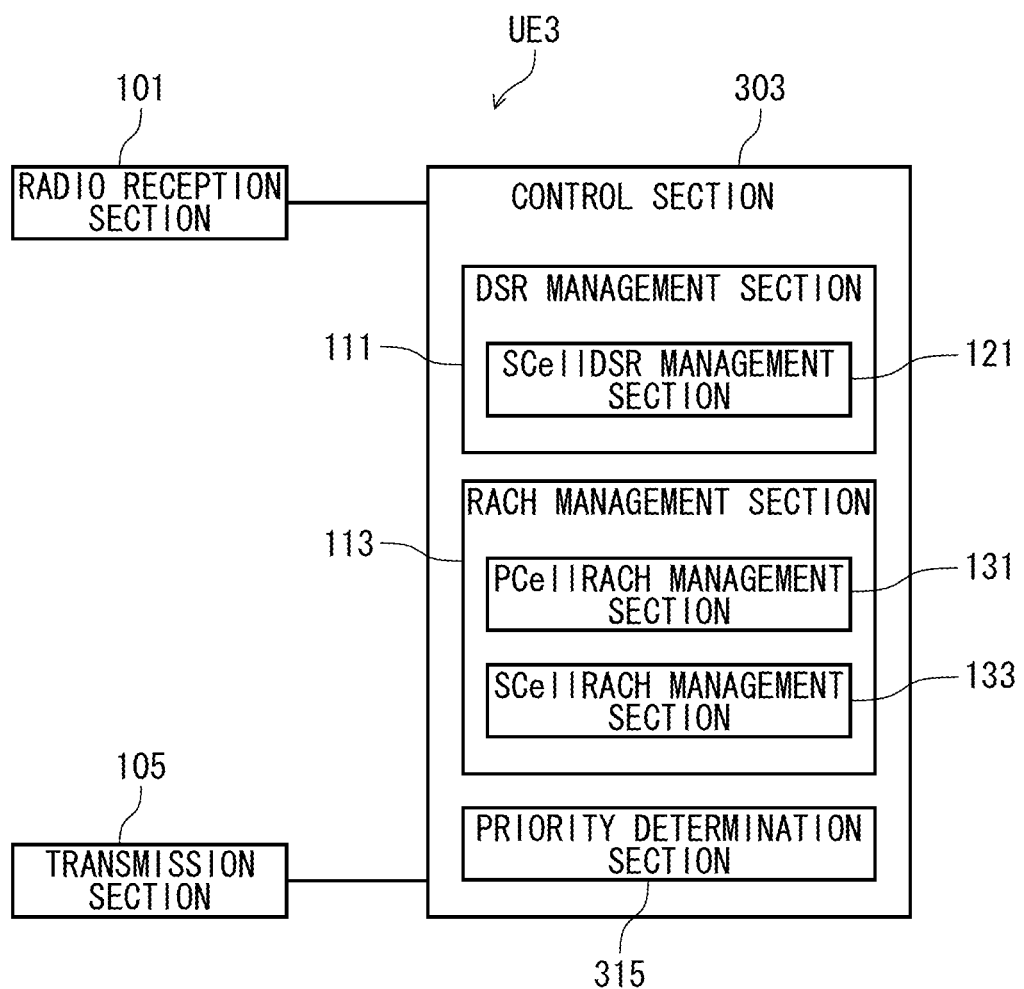
FIG. 15 is a block diagram of the equipment UE3 that makes up the wireless communication system according to the third embodiment.

FIG. 15 is a block diagram of the equipment UE3 that makes up the wireless communication system according to the third embodiment. As illustrated in FIG. 15, the equipment UE3 according to the third embodiment includes the reception section 101, a control section 303, and the transmission section 105. The control section 303 results from adding a priority determination section 315 to the DSR management section 111 and the RACH management section 113 included in the control section 103 according to the first embodiment. The control section 303, the RACH management section 113, and the priority determination section 315 according to the present embodiment are described below. The other constituent elements are the same as those according to the first embodiment and thus descriptions of the other constituent elements are omitted.

The control section 303 instructs the reception section 101 to receive the control information, such as the report information or the dedicated control information. The control information received by the reception section 101 is input into the control section 303. Information relating to a random access channel configuration (RACH config) that is included in the control information that is input into the control section 303 is input into the RACH management section 113 of the control section 303. Furthermore, the configuration information on the dedicated scheduling request resource that is included in the control information that is input into the control section 303 is input into the DSR management section 111 of the control section 303.

The control section 303 outputs determination-method setting information for determining the priority of the uplink data that is set in advance, or determination-method setting information for determining the priority of the uplink data, the notification of which is given with the dedicated control information, to the priority determination section 315. Based on a state of the equipment UE3 and the control information, the control section 303 instructs the DSR management section 111 to release the dedicated scheduling request resource.

If the uplink resource is not granted to the equipment UE3, when the uplink data occurs in the equipment UE3 and thus is available for transmission, the control section 303 instructs the DSR management section 111 to transmit the scheduling request (SR). Moreover, after instructing the DSR management section 111 to transmit the scheduling request, when the uplink resource is granted to the equipment UE3, the control section 303 notifies the DSR management section 111 that the uplink resource is granted. Furthermore, when notified by the DSR management section 111 that the scheduling request cannot be transmitted, the control section 303 inputs information relating to the uplink data in order for the priority determination section 315 to determine the priority. The control section 303 outputs a result of determining the priority of the uplink data that is output from the priority determination section 315 and an instruction to start the random access procedure to the RACH management section 113.

When information necessary for transmitting the uplink data, which is included in the random access response obtained from the RACH management section 113, is input, the control section 303 instructs the transmission section 105 to transmit the uplink data that is desired to be transmitted, using the designated uplink. Furthermore, when information necessary for transmitting the corresponding uplink data that is included in the random access response obtained from the RACH management section 113 and information indicating that the contention resolution is necessary are input, the control section 303 creates a message (message 3) based on these items of information and thus outputs the corresponding message to the transmission section 105.

If the reception section 101 receives the contention resolution message, the control section 303 outputs the corresponding message, which is input from the reception section 101, to the RACH management section 113. On the other hand, if the reception section 101 does not receive the contention resolution message, the control section 303 instructs the RACH management section 113 to re-transmit the random access preamble. When notified by the RACH management section 113 that the random access procedure fails, the control section 303 starts a re-establishment procedure.

Among the random access channel configurations (RACH config) that are input from the control section 303, the RACH management section 113 included in the control section 303 outputs a SCell random access channel configuration to the SCellRACH management section 133 and outputs a PCell random access channel configuration to the PCellRACH management section 131. When instructed by the control section 303 to start the random access procedure, the RACH management section 113 determines which one of the SCellRACH management section 133 and the PCellRACH management section 131 is instructed to start the random access procedure. If the uplink data that is input from the control section 303 is of low priority, when the SCell random access channel configuration is set in the SCellRACH management section 133, the RACH management section 113 determines that the random access procedure is started in SCell.

Moreover, only if the dedicated control information that the random access procedure in which the equipment plays a leading role in SCell is permitted is input, the RACH management section 113 may determine that the random access procedure is started in SCell. In this case, the equipment UE3 can prevent the random access procedure from being performed arbitrarily in SCell.

When determining that the random access procedure is started in SCell, the RACH management section 113 instructs the SCellRACH management section 133 to start the random access procedure. After the SCellRACH management section 133 is instructed to start the random access procedure, when the random access response is input from the reception section 101, the RACH management section 113 outputs that random access response to the SCellRACH management section 133.

When notified by the SCellRACH management section 133 of the information necessary for transmitting the uplink data included in the random access response and success of the random access procedure, the RACH management section 113 outputs the information necessary for transmitting the uplink data and the success of the random access procedure to the control section 303.

When notified by the SCellRACH management section 133 of the information necessary for transmitting the uplink data included in the random access response and the information indicating that the contention resolution is necessary, the RACH management section 113 outputs the information necessary for transmitting the uplink data and the information indicating that the contention resolution is necessary, to the control section 303. Furthermore, in this state, when instructed by the control section 303 to re-transmit the random access preamble, the RACH management section 113 instructs the SCellRACH management section 133 to re-transmit the random access preamble. In the same manner, in this state, when notified by the control section 303 that the reception section 101 receives the contention resolution message, the RACH management section 113 outputs a notification that the reception section 101 receives the contention resolution message, to the SCellRACH management section 133.

When notified by the SCellRACH management section 133 that the random access procedure fails, the RACH management section 113 notifies the PCellRACH management section 131 that the PCellRACH management section 131 has to start the random access procedure. Furthermore, when determining that the random access procedure in which the equipment plays a leading role cannot be started in SCell, the RACH management section 113 notifies the PCellRACH management section 131 that the PCellRACH management section 131 has to start the random access procedure. Furthermore, if the uplink data that is input from the control section 303 is of high priority, the RACH management section 113 notifies the PCellRACH management section 131 that the PCellRACH management has to start the random access procedure. After the PCellRACH management section 131 is instructed to start the random access procedure, when the random access response is input from the reception section 101, the RACH management section 113 outputs that random access response to the PCellRACH management section 131.

When notified by the PCellRACH management section 131 of the information necessary for transmitting the uplink data included in the random access response and success of the random access procedure, the RACH management section 113 outputs the information necessary for transmitting the uplink data and the success of the random access procedure to the control section 303.

When the information necessary for transmitting the uplink data included in the random access response and the information indicating that the contention resolution is necessary are input from the PCellRACH management section 131, the RACH management section 113 outputs the information necessary for transmitting the uplink data and the information indicating that the contention resolution is necessary to the control section 303. Furthermore, in this state, when instructed by the control section 303 to re-transmit the random access preamble, the RACH management section 113 instructs the PCellRACH management section 131 to re-transmit the random access preamble. In the same manner, in this state, when notified by the control section 303 that the reception section 101 receives the contention resolution message, the RACH management section 113 outputs a notification that the reception section 101 receives the contention resolution message, to the PCellRACH management section 131.

The priority determination section 315 manages the determination-method setting information for determining the priority of the uplink data that is input from the control section 303. Furthermore, when the information relating to the uplink data is input from the control section 303, the priority determination section 315 determines the priority of the corresponding uplink data from the determination method setting information that is managed and outputs a result of the determination (the high priority or the low priority) to the control section 303.

[Configuration of the Wireless Communication Device NE31 According to the Third Embodiment]

Figure 16:
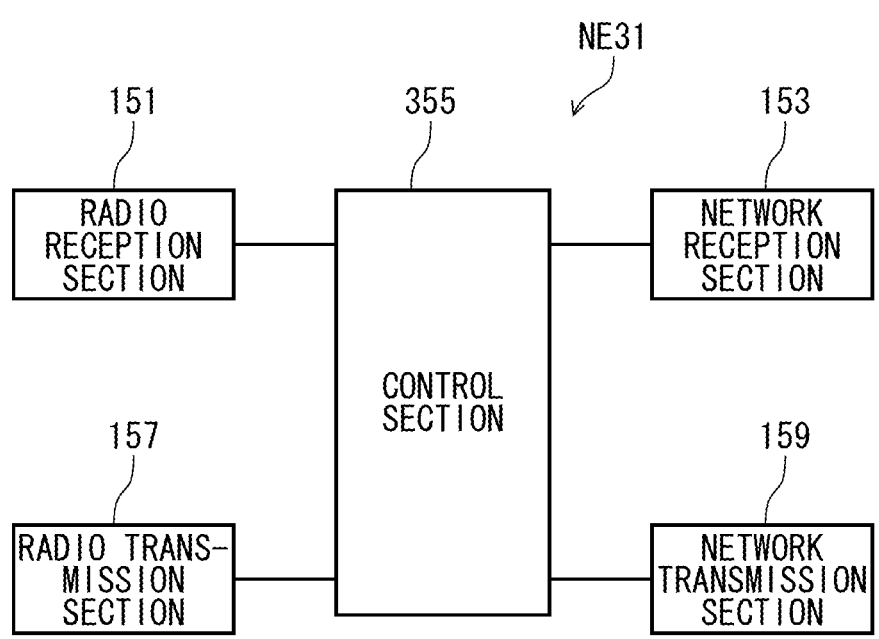
FIG. 16 is a block diagram of the wireless communication device NE31 that makes up the wireless communication system according to the third embodiment.

FIG. 16 is a block diagram of the wireless communication device NE31 that makes up the wireless communication system according to the third embodiment. As illustrated in FIG. 16, the wireless communication device NE31 according to the third embodiment includes the radio reception section 151, the network reception section 153, a control section 355, the radio transmission section 157, and the network transmission section 159. Because a difference between the wireless communication device NE31 according to the third embodiment and the wireless communication device NE11 according to the first embodiment is in operation of the control section 355, the control section 355 according to the present embodiment is described below.

In addition to the function of the control section 155 according to the first embodiment, the control section 355 has a function of creating the determination-method setting information for determining which one of the PRACH resource of PCell and the PRACH resource of SCell is used to transmit the random access preamble. Moreover, the determination-method setting information may include information that is described with the determination method examples 1 to 7 described above. Furthermore, the determination-method setting information may include a flag indicating that if the uplink data is of low priority, the random access procedure in which the equipment plays a passive role may be started in SCell based on the determination-method setting information retained by the equipment UE3. The control section 355 creates the dedicated control information including the determination-method setting information and thus outputs the created dedicated control information to the radio transmission section 157.

(Operation of the Equipment UE3 According to the Third Embodiment)

Figure 17:
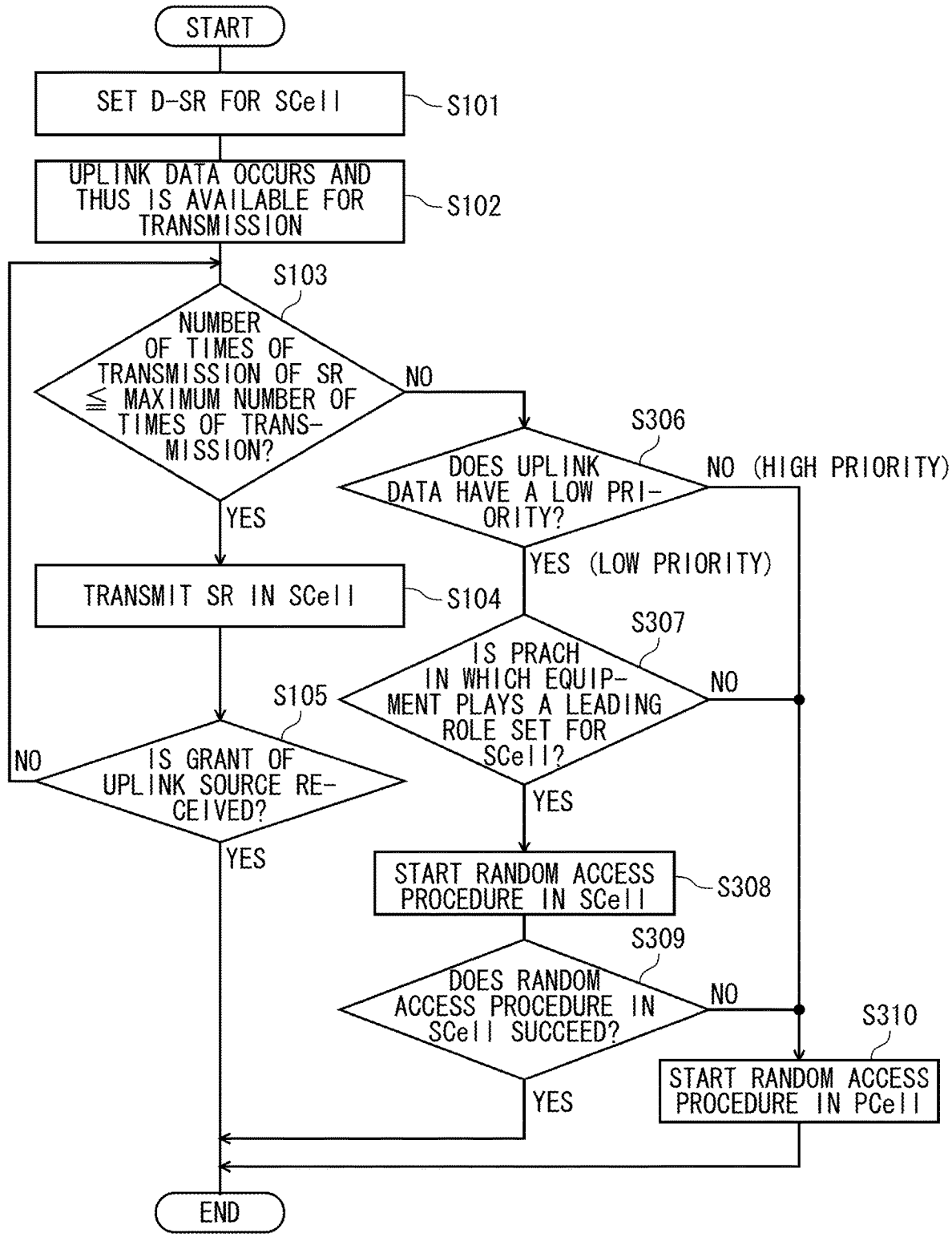
FIG. 17 is a flow chart illustrating operation of the equipment UE3 in the case where, in the state where the uplink resource is not granted to the equipment UE3, the uplink data occurs in the equipment UE3 and thus is available for transmission, in the wireless communication system according to the third embodiment.

Operation of the equipment UE3 in the case where in a state where the uplink resource is not granted to the equipment UE3, the uplink data occurs in the equipment UE3 and thus is available for transmission is described below referring to FIG. 17. FIG. 17 is a flow chart illustrating the operation of the equipment UE3 in the case where in the state where the uplink resource is not granted to equipment UE3, the uplink data occurs in the equipment UE3 and thus is available for transmission, in the wireless communication system according to the third embodiment. Moreover, in FIG. 17, like reference numerals are given to the same steps as the steps in the flowchart according to the first embodiment in FIG. 8.

As illustrated in FIG. 17, the dedicated scheduling request resource (D-SR) in SCell is set for the equipment UE3 (Step S101). Next, when in the state where the uplink is not granted, the uplink data occurs and thus is available for transmission (Step S102), the equipment UE3 proceeds to Step S103.

In Step S103, the equipment UE3 determines whether or not the number of times of transmission of the scheduling request that uses the dedicated scheduling request resource exceeds the maximum number of times of transmission (the number of times of transmission of the scheduling request the maximum number of times of transmission). If the number of times of transmission of the scheduling request that uses the dedicated scheduling request resource does not exceed the maximum number of times of transmission (Yes in S103), the equipment UE1 proceeds to Step S104. If the number of times of transmission of the scheduling request that uses the dedicated scheduling request resource exceeds the maximum number of times of transmission (No in S103), the equipment UE1 proceeds to Step S306.

In Step S104, the equipment UE3 transmits the scheduling request using the dedicated scheduling request resource of SCell. Next, the equipment UE3 determines whether or not the grant of the uplink resource is received (Step S105). If the uplink resource is granted, the equipment UE3 terminates a sequence of processing steps. If the uplink resource is not granted, the equipment UE3 returns to Step S103.

In Step S306, the equipment UE3 determines whether the uplink data is of high priority or of low priority, based on the determination-method setting information managed by the priority determination section 315. If the uplink data is of low priority, the equipment UE3 proceeds to Step S307. If the uplink data is of high priority, the equipment UE3 proceeds to Step S310.

In Step S307, the equipment UE3 determines whether the starting of the random access procedure in which the equipment plays a leading role in SCell is permitted and whether or not the PRACH resource is set for SCell. If the PRACH resource for starting the random access procedure in which it is determined that the equipment plays a leading role is set for SCell, the equipment UE3 proceeds to Step S308. If the PRACH resource for starting the random access procedure in which the equipment plays a leading role is determined not to be set for SCell, the equipment UE1 proceeds to Step S310.

In Step S308, the equipment UE3 starts the random access procedure in SCell. Next, the equipment UE3 determines whether or not the random access procedure in SCell succeeds (Step S309). If the random access procedure in SCell is determined to succeed, the equipment UE3 terminates a sequence of processing steps. If the random access procedure in SCell is determined to fail, the equipment UE1 proceeds to Step S310.

In Step S310, the equipment UE3 starts the random access procedure in PCell. Moreover, if the random access procedure in PCell fails, the equipment UE3 starts a re-connection procedure.

As illustrated above, according to the present embodiment, power consumption can be reduced when transmitting the scheduling request of the equipment UE3, because the equipment UE3 transmits the scheduling request using the dedicated scheduling request resource of SCell. Furthermore, although the scheduling request is performed in SCell by the equipment UE3, if the uplink resource is not granted, there is a likelihood that a radio link state of SCell will be poor. Because when transmitting the high-priority uplink data, the random access procedure is performed using PCell that is more stabilized in radio link than SCell, there is a low likelihood that the corresponding random access procedure will fail. Therefore, the time it takes to set the uplink resource for the equipment UE3 can be shortened. On the other hand, because when transmitting the low-priority uplink data, the random access procedure is performed using SCell, the corresponding random access procedure can be performed with low transmission power, and the power consumption of the equipment UE3 can be reduced. Furthermore, because the frequency with which the PRACH resource of PCell is used can be lowered, the frequency resource can be effectively utilized.

Fourth Embodiment

A wireless communication system according to a fourth embodiment is described referring to FIG. 18 to FIG. 21.

The wireless communication system according to the fourth embodiment is different from the wireless communication system according to the second embodiment in that depending on whether or not a path loss value for calculating the transmission power in the case of transmitting the scheduling request using the dedicated scheduling request resource of SCell is at a threshold or above, the equipment determines whether to transmit the scheduling request using the dedicated scheduling request resource of SCell, or to start the random access procedure in PCell. In other respects, the fourth embodiment is the same as the second embodiment.

Figure 18:
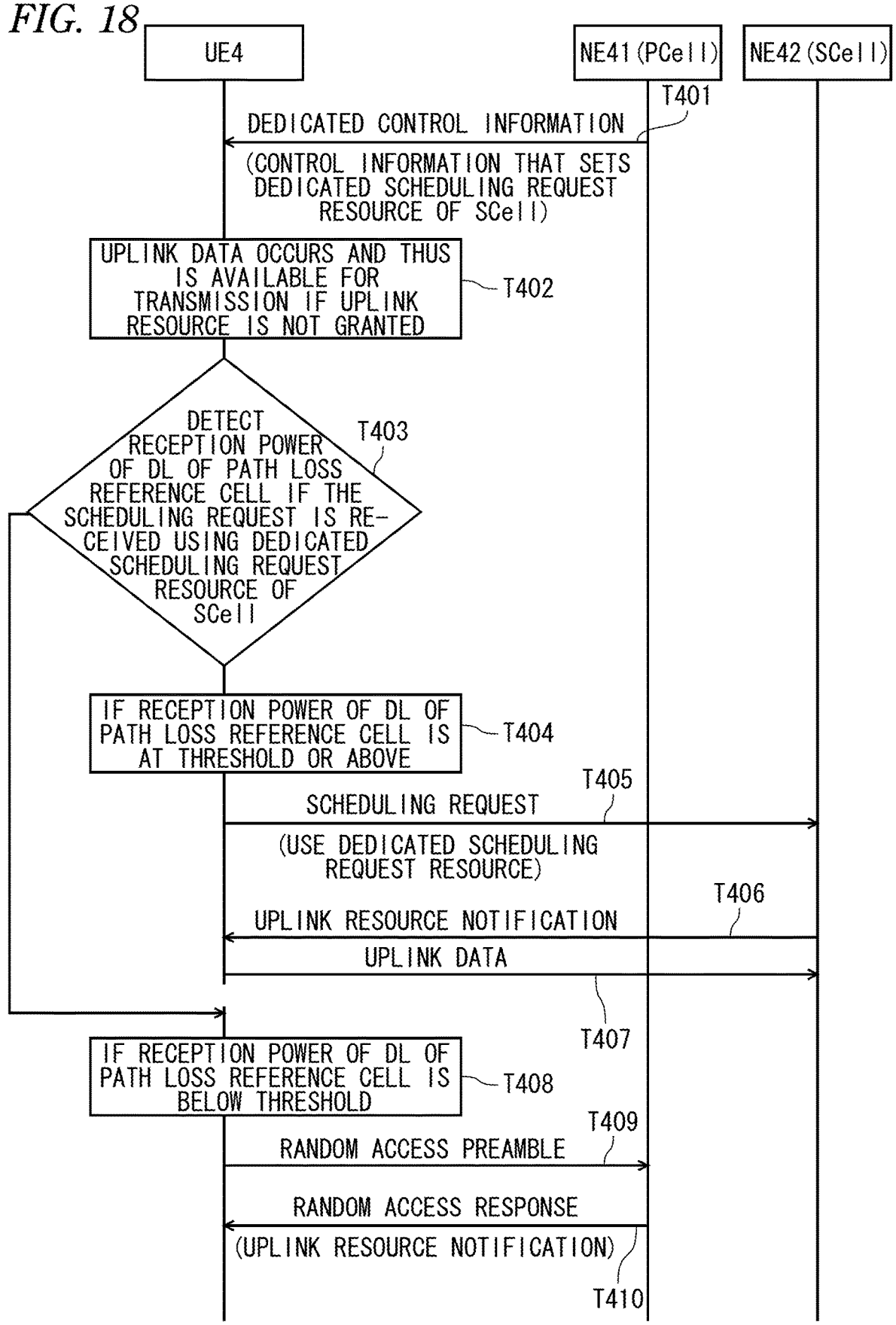
FIG. 18 is a diagram illustrating an example of a timing chart that includes processing between equipment UE4 and wireless communication devices NE41 and NE42 in a wireless communication system according to a fourth embodiment.

FIG. 18 is a diagram illustrating an example of a timing chart that includes processing between equipment UE4 and wireless communication devices NE41 and NE42 in the wireless communication system according to the fourth embodiment. The equipment UE4 is equal to the equipment UE1 illustrated in FIG. 1, the wireless communication device NE41 is equal to the wireless communication device NE1 illustrated in FIG. 1 and the wireless communication device NE21 according to the second embodiment, and the wireless communication device NE42 is equal to the wireless communication device NE2 illustrated in FIG. 1 and the wireless communication device NE22 according to the second embodiment. Furthermore, carrier aggregation, which uses PCell provided by the wireless communication device NE41 and SCell provided by the wireless communication device NE42 as one component carrier set, is set in the equipment UE4.

As illustrated in FIG. 18, the wireless communication device NE41 transmits dedicated control information, which includes control information that sets a dedicated scheduling request resource of SCell in the equipment UE4, to the equipment UE4 (T401).

In the processing T401 described above, the dedicated control information is transmitted with an RRC connection setup message, an RRC connection reconfiguration message, or other RRC messages, or with signaling of the MAC layer or of the physical layer. Moreover, the dedicated control information may be transmitted by the wireless communication device NE42.

If in the case of the absence of the grant of the uplink resource, the uplink data occurs and thus is available for transmission (T402), the equipment UE4 detects reception power for a downlink (DL) of a path loss reference cell, as a value in the case of transmitting the scheduling request (SR) to the wireless communication device NE42 using the dedicated scheduling request resource of SCell (T403).

When it is determined that the reception power for DL of the path loss reference cell is at the threshold or above in processing T403 (T404), the equipment UE4 transmits the scheduling request to the wireless communication device NE42 using the dedicated scheduling request resource of SCell (T405). The wireless communication device NE42 notifies the equipment UE4 of the uplink resource that is granted in response to the received scheduling request (SR) (T406). The equipment UE4 transmits the uplink data to the wireless communication device NE42 using the uplink resource, the notification of which is given (T407).

Moreover, when receiving the scheduling request (SR) transmitted from the equipment UE4 in the processing T407, the wireless communication device NE42 may notify the wireless communication device NE41 that the scheduling request (SR) receives from the equipment UE4. In this case, the wireless communication device NE41 sets the uplink resource for the equipment UE4. In this manner, if any one of the wireless communication device NE41 and the wireless communication device NE42 can set the uplink resource, the optimal uplink resource can be granted to the equipment UE4 according to an amount of traffic in or reception quality of the equipment UE4.

On the other hand, in the processing T403, when it is determined that the reception power for DL of the path loss reference cell is below the threshold (T408), the equipment UE4 transmits the random access preamble to wireless communication device NE41 (T409). The wireless communication device NE41 creates a random access response that includes a notification of the uplink resource and transmits the created random access response to the equipment UE4 (T410). When receiving the random access response, the equipment UE4 transmits the uplink data to the wireless communication device NE41 using the uplink resource, the notification of which is given by the corresponding random access response.

According to the present embodiment, the equipment UE4 compares the reception power for DL of the path loss reference cell and the threshold, but instead of reception power (dBm), the equipment UE4 may compare reception quality (dB) that reflects interference power and the threshold. Furthermore, the equipment UE4 may compare the reception power for DL of the timing reference cell for obtaining the transmission timing of SCell that transmits the scheduling request, or the reception quality and the threshold. Furthermore, the equipment UE 4 may compare the reception power for DL of an SIB2 linked cell of SCell that receives the scheduling request, or the reception quality and the threshold. Moreover, the equipment UE4 may compute the path loss value for calculating the transmission power in the case where the scheduling request is transmitted to the wireless communication device NE42 using the dedicated scheduling request resource of SCell, and may compare such a path loss value and the threshold.

Moreover, the equipment UE4 compares the reception power for DL of the path loss reference cell and the threshold, but may make a determination, depending on whether or not the equipment UE4 can detect DL of the path loss reference cell. That is, if the equipment UE4 cannot detect DL of the path loss reference cell, the equipment UE4 determines whether the reception power for DL is below the threshold. Furthermore, the equipment UE4 may make a determination, depending on whether the equipment UE4 can compute the loss value. That is, if the equipment UE4 cannot compute the path loss value, the equipment UE4 determines whether the path loss value is below the threshold. This is true for other cases as well.

[Configuration of the Equipment UE4 According to the Fourth Embodiment]

Figure 19:
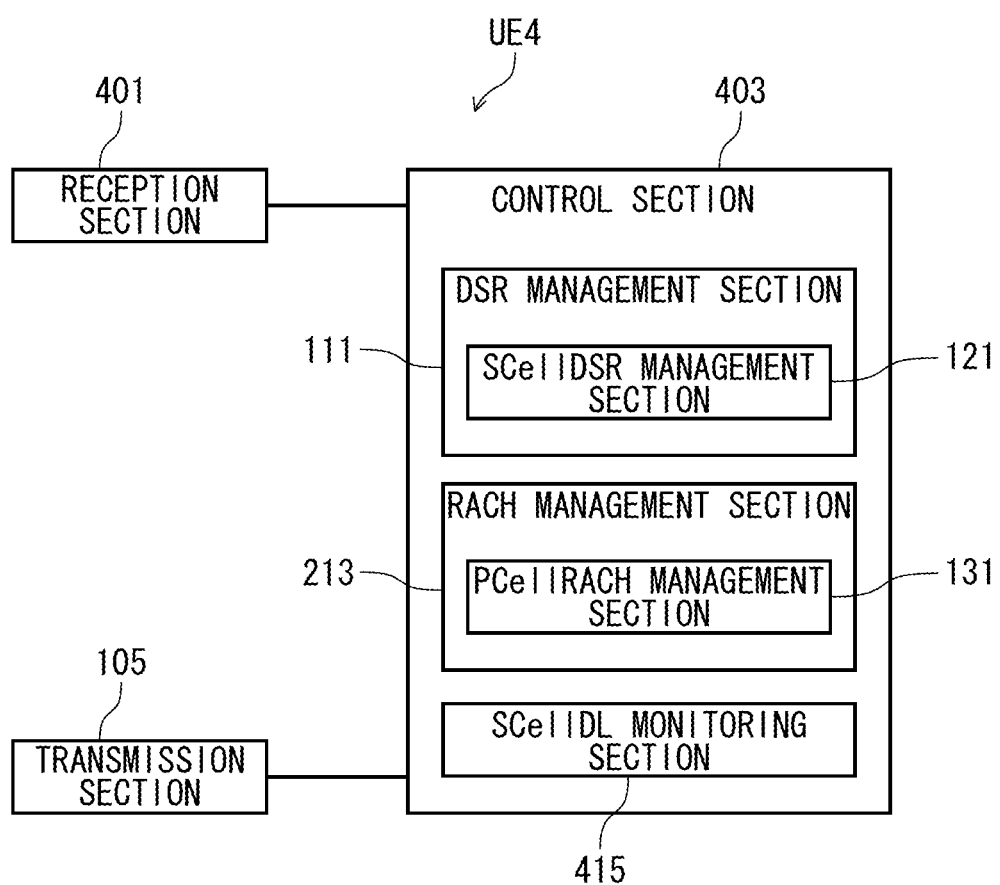
FIG. 19 is a block diagram of the equipment UE4 that makes up the wireless communication system according to the fourth embodiment.

FIG. 19 is a block diagram of the equipment UE4 that makes up the wireless communication system according to the fourth embodiment. As illustrated in FIG. 19, the equipment UE4 according to the fourth embodiment includes a reception section 401, a control section 403, and the transmission section 105. The control section 403 results from adding an SCellDL monitoring section 415 to the DSR management section 111 and the RACH management section 213 included in the control section 203 according to the second embodiment. The reception section 401, the control section 403, and the SCellDL monitoring section 415 according to the present embodiment are described below. The other constituent elements are the same as those according to the second embodiment and thus descriptions of the other constituent elements are omitted.

According to an instruction from the control section 403, the reception section 401 receives the control information, such as report information or the dedicated control information, via a downlink of a cell to which the equipment UE4 is connected. The reception section 401 outputs the received control information to the control section 403. Furthermore, the reception section 401 receives the random access response. The reception section 401 outputs the received random access response to the RACH management section 213 of the control section 403. Moreover, the reception section 401 receives a contention resolution message. The reception section 401 outputs the received contention resolution message to the control section 403. Moreover, the random access response received by the reception section 401, although transmitted from the wireless communication device NE41, may be transmitted from the wireless communication device NE42.

According to an instruction from the SCellDL monitoring section 415, the reception section 401 outputs the reception power for DL of the corresponding cell to the SCellDL monitoring section 415.

The control section 403 instructs the reception section 401 to receive the control information, such as the report information or the dedicated control information. The control information received by the reception section 401 is input into the control section 403. Information relating to a random access channel configuration (RACH config) that is included in the control information that is input into the control section 403 is input into the RACH management section 213 of the control section 403. Furthermore, the configuration information on the dedicated scheduling request resource that is included in the control information that is input into the control section 403 is input into the DSR management section 111 of the control section 403. Based on a state of the equipment UE4 and the control information, the control section 403 instructs the DSR management section 111 to release the dedicated scheduling request resource.

When obtaining the threshold with which to compare the reception power for DL of the path loss reference cell from the dedicated control information received by the reception section 401, the control section 403 outputs such a threshold to the SCellDL monitoring section 415. Moreover, the control section 403 may generate the threshold with which to compare the reception power for the path loss reference cell in the equipment UE4.

If the uplink resource is not granted to the equipment UE4, when the uplink data occurs in the equipment UE4 and thus is available for transmission, the control section 403 requests the SCellDL monitoring section 415 to check whether or not the reception power for DL of the path loss reference cell is at the threshold or above in the cell that transmits the scheduling request (SR). When notified by the SCellDL monitoring section 415 that the reception power for DL of the path loss reference cell is at the threshold or above, the control section 403 instructs the DSR management section 111 to transmit the scheduling request (SR). Moreover, after instructing the DSR management section 111 to transmit the scheduling request, when the uplink resource is granted to the equipment UE4, the control section 403 notifies the DSR management section 111 that the uplink resource is granted. When notified by the DSR management section 111 that the scheduling request cannot be transmitted, the control section 403 instructs the RACH management section 213 to start the random access procedure. Furthermore, when notified by the SCellDL monitoring section 415 that the reception power for DL of the path loss reference cell is below the threshold, the control section 403 instructs the RACH management section 213 to start a random access procedure.

When information necessary for transmitting the uplink data, which is included in the random access response obtained from the RACH management section 213, is input, the control section 403 instructs the transmission section 105 to transmit the uplink data that is desired to be transmitted, using the designated uplink. Furthermore, when information necessary for transmitting the corresponding uplink data that is included in the random access response obtained from the RACH management section 213 and information indicating that the contention resolution is necessary are input, the control section 403 creates a message (message 3) based on these items of information and thus outputs the corresponding message to the transmission section 105.

If the reception section 401 receives the contention resolution message, the control section 403 outputs the corresponding message, which is input from the reception section 401, to the RACH management section 213. On the other hand, if the reception section 401 does not receive the contention resolution message, the control section 403 instructs the RACH management section 213 to re-transmit the random access preamble. When notified by the RACH management section 213 that the random access procedure fails, the control section 403 starts a re-establishment procedure.

When setting of the threshold with which to compare the reception power for DL of the path loss reference cell is input from the control section 403, the SCellDL monitoring section 415 manages such a setting. When the cell with which to compare the threshold is designated by the control section 403, the SCellDL monitoring section 415 instructs the reception section 401 to measure the reception power for DL of the corresponding cell. The SCellDL monitoring section 415 compares the reception quality of DL of the corresponding cell that is input from the reception section 401, and the threshold that is set. The SCellDL monitoring section 415 outputs a result of determining whether or not the reception power for DL of the corresponding cell is at the threshold or above, to the control section 403.

[Configuration of the Wireless Communication Device NE41 According to the Fourth Embodiment]

Figure 20:
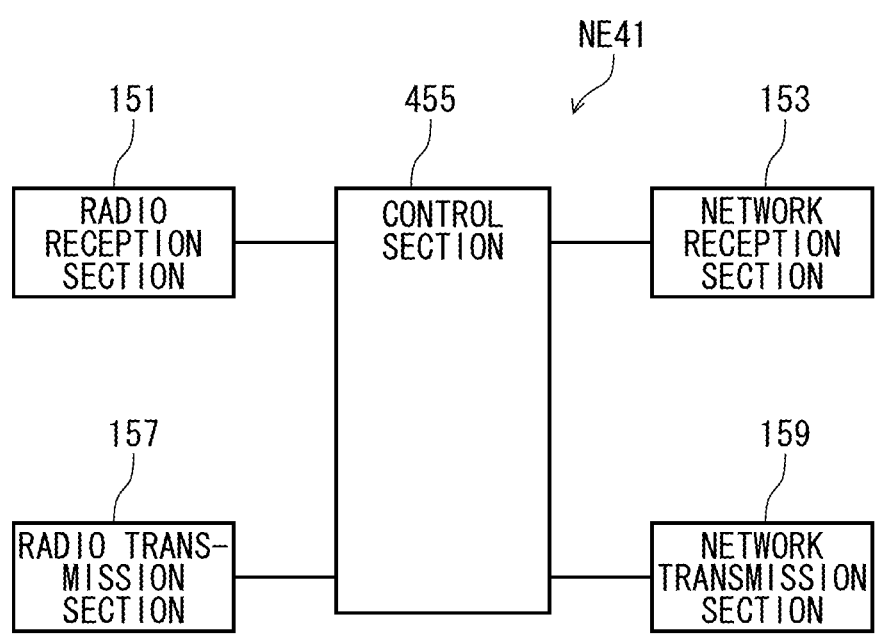
FIG. 20 is a block diagram of the wireless communication device NE41 that makes up the wireless communication system according to the fourth embodiment.

FIG. 20 is a block diagram of the wireless communication device NE41 that makes up the wireless communication system according to the fourth embodiment. As illustrated in FIG. 20, the wireless communication device NE41 according to the fourth embodiment includes the radio reception section 151, the network reception section 153, a control section 455, the radio transmission section 157, and the network transmission section 159. Because a difference between the wireless communication device NE41 according to the fourth embodiment and the wireless communication device NE21 according to the second embodiment is in operation of the control section 455, the control section 455 according to the present embodiment is described below.

In addition to the function of the control section 255 included in the wireless communication device NE21 according to the second embodiment, the control section 455 may have a function in which the equipment UE4 creates the threshold with which to compare the reception power for DL of the path loss reference cell. In such a case, the control section 455 creates the dedicated control information including the corresponding threshold and thus outputs the created dedicated control information to the radio transmission section 157.

(Operation of the Equipment UE4 According to the Fourth Embodiment)

Figure 21:
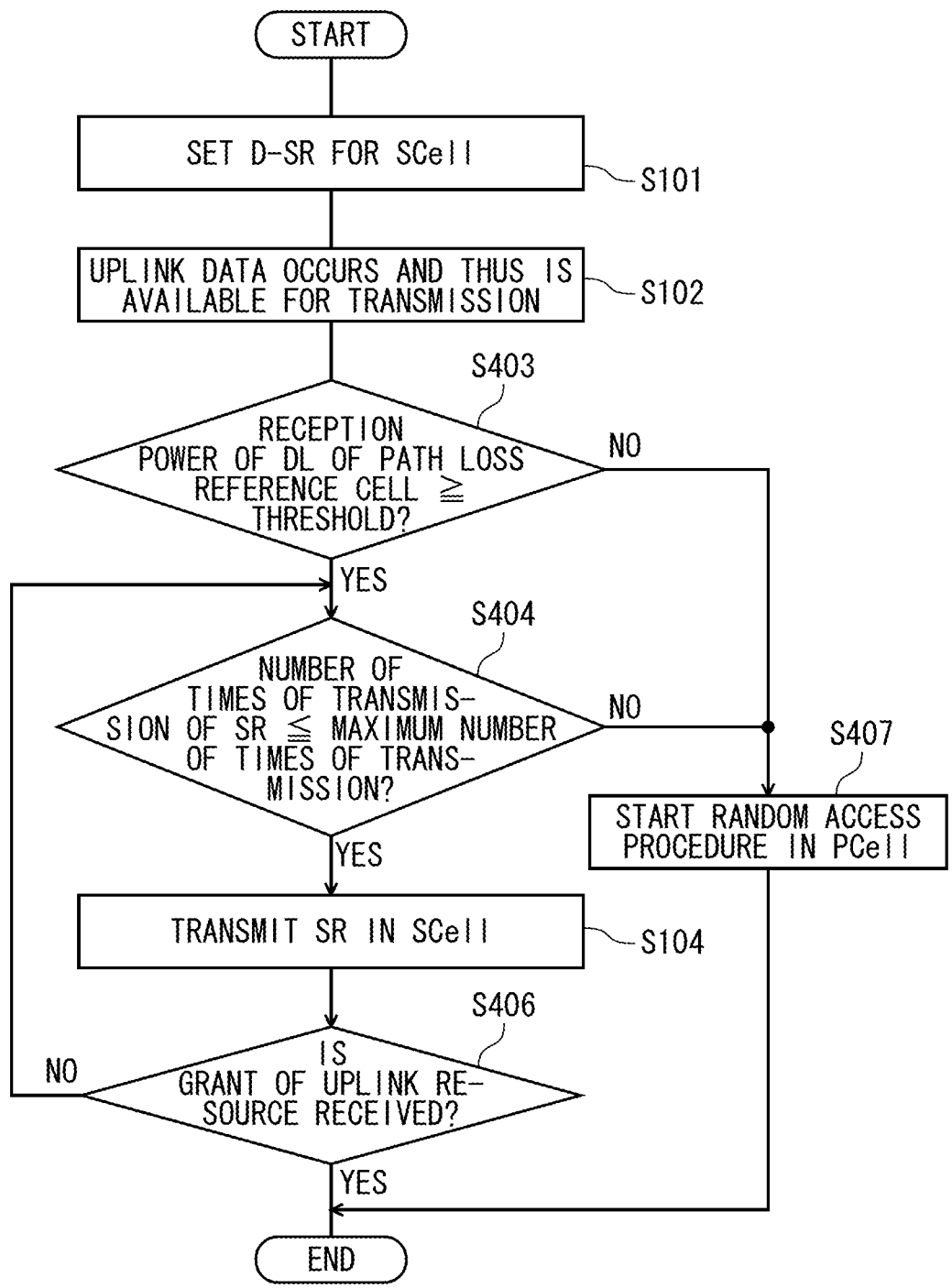
FIG. 21 is a flow chart illustrating operation of the equipment UE4 in the case where in the state where the uplink resource is not granted to the equipment UE4 the uplink data occurs in the equipment UE4 and thus is available for transmission, in the wireless communication system according to the fourth embodiment.

Operation of the equipment UE4 in the case where, in a state where the uplink resource is not granted to the equipment UE4, the uplink data occurs in the equipment UE4 and thus is available for transmission is described below referring to FIG. 21. FIG. 21 is a flow chart illustrating the operation of the equipment UE4 in the case where, in the state where the uplink resource is not granted to the equipment UE4, the uplink data occurs in the equipment UE4 and thus is available for transmission, in the wireless communication system according to the fourth embodiment. Moreover, in FIG. 21, like reference numerals are given to the same steps as the steps in the flowchart according to the second embodiment in FIG. 12.

As illustrated in FIG. 21, the dedicated scheduling request resource (D-SR) in SCell is set for the equipment UE4 (Step S101). Next, when, in the state where the uplink is not granted, the uplink data occurs and thus is available for transmission (Step S102), the equipment UE4 proceeds to Step S403.

In Step S403, the equipment UE4 compares the reception power for DL of the path loss reference cell and the threshold in the case of transmitting the scheduling request using the dedicated scheduling request resource of SCell. If the reception power for DL of the path loss reference cell is at the threshold or above, the equipment UE4 proceeds to Step S404. If the reception power for DL of the path loss reference cell is below the threshold, the equipment UE4 proceeds to Step S407.

In Step S404, the equipment UE4 determines whether or not the number of times of transmission of the scheduling request that uses the dedicated scheduling request resource exceeds the maximum number of times of transmission (the number of times of transmission of the scheduling request-≤the maximum number of times of transmission). If the number of times of transmission of the scheduling request that uses the dedicated scheduling request resource does not exceed the maximum number of times of transmission (Yes in S404), the equipment UE4 proceeds to Step S405. If the number of times of transmission of the scheduling request that uses the dedicated scheduling request resource exceeds the maximum number of times of transmission (No in S404), the equipment UE4 proceeds to Step S407.

In Step S405, the equipment UE4 transmits the scheduling request using the dedicated scheduling request resource of SCell. Next, the equipment UE4 determines whether or not the grant of the uplink resource is received (Step S406). If the uplink resource is granted, the equipment UE4 terminates a sequence of processing steps. If the uplink resource is not granted, the equipment UE4 returns to Step S404.

In Step S407, the equipment UE4 starts the random access procedure in PCell. Moreover, if the random access procedure in PCell fails, the equipment UE4 starts a re-connection procedure.

As described above, according to the present embodiment, although the equipment UE4 transmits the scheduling request to the wireless communication device NE42 using the dedicated scheduling request resource of SCell, if a situation occurs in which the scheduling request does not arrive, the equipment UE4 starts the random access procedure of PCell that is more stabilized in radio link than SCell, without actually transmitting the scheduling request. For this reason, power consumption of the equipment UE4 can be reduced and delay time can be shortened as well because the equipment UE4 does not need to perform useless transmitting processing.

Fifth Embodiment

A wireless communication system according to a fifth embodiment is described referring to FIG. 22 to FIG. 26. In the wireless communication system according to the fifth embodiment, the equipment transmits the scheduling request (SR) to the wireless communication device in order for the wireless communication device to set an uplink resource for the equipment. In response to the scheduling request, the wireless communication device sets the uplink resource for the equipment. Furthermore, the wireless communication device performs grant of a radio resource (for example, a frequency band in a frequency domain or a time domain) to each equipment and management of the radio resource and has a role of an access point of a radio access network for the equipment.

Figure 22:
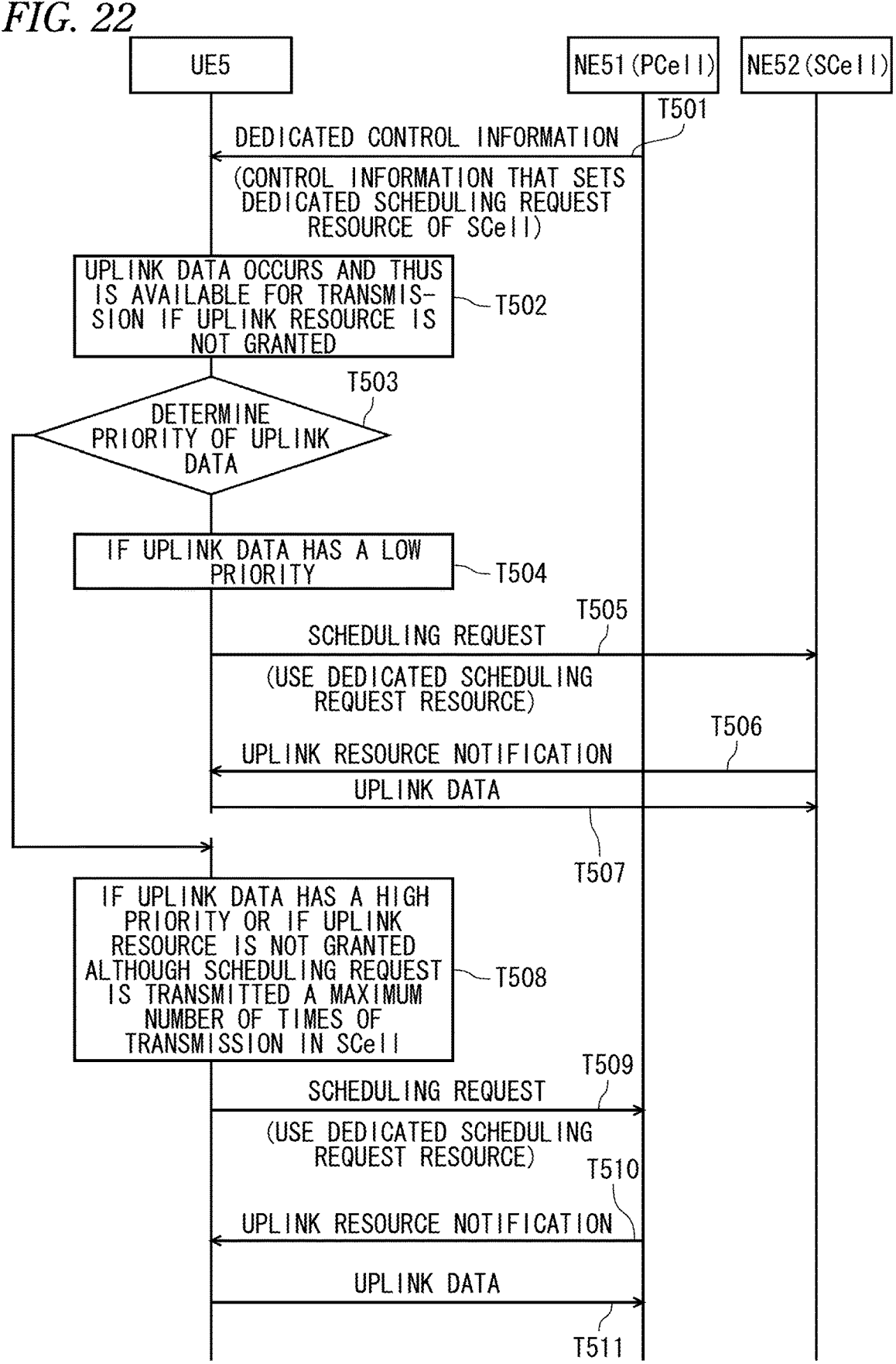
FIG. 22 is a diagram illustrating an example of a timing chart that includes processing between equipment UE5 and wireless communication devices NE51 and NE52 in a wireless communication system according to a fifth embodiment.
Figure 23:
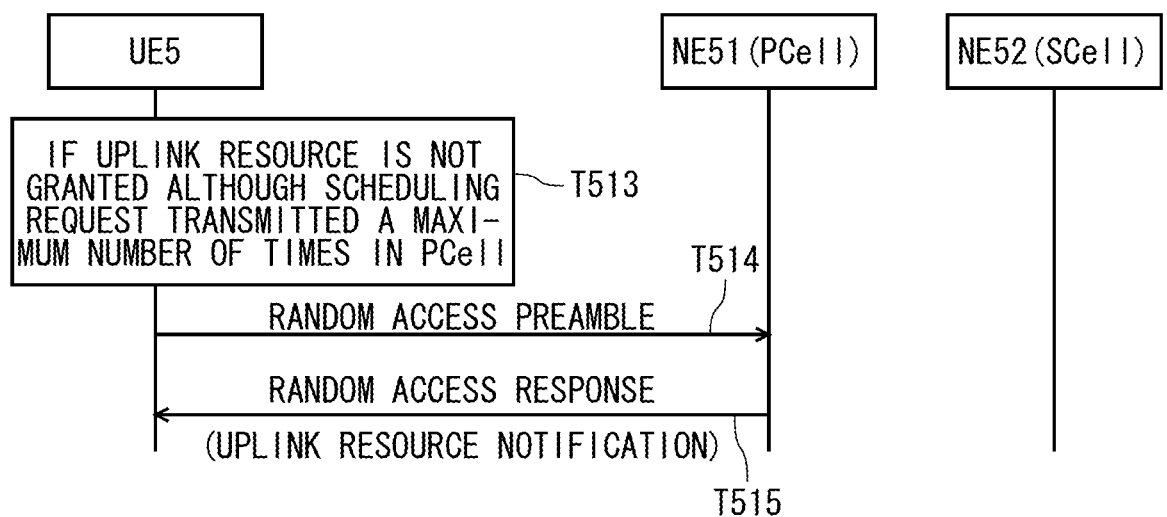
FIG. 23 is a diagram illustrating one example of a timing chart that includes processing performed between the equipment UE5 and the wireless communication device NE51 if the uplink resource is not granted although the equipment UE5 performs the scheduling request.

FIG. 22 and FIG. 23 are diagrams illustrating an example of a timing chart that includes processing between equipment UE5 and wireless communication devices NE51 and NE52 in the wireless communication system according to the fifth embodiment. The equipment UE5 is equal to the equipment UE illustrated in FIG. 1, the wireless communication device NE41 is equal to the wireless communication device NE1 illustrated in FIG. 1, and the wireless communication device NE42 is equal to the wireless communication device NE2 illustrated in FIG. 1. Furthermore, carrier aggregation, which uses PCell provided by the wireless communication device NE51 and SCell provided by the wireless communication device NE52 as one component carrier set, is set in the equipment UE5.

As illustrated in FIG. 22, the wireless communication device NE51 transmits dedicated control information, which includes control information that sets a dedicated scheduling request resource of SCell and a dedicated scheduling request resource of PCell in the equipment UE5, to the equipment UE5 (T501). Moreover, the maximum number of times of transmission of each scheduling request in SCell or PCell is included in the corresponding control information.

In the processing T501 described above, the dedicated control information is transmitted with an RRC connection setup message, an RRC connection reconfiguration message, or other RRC messages, or with signaling of the MAC layer or of the physical layer. Moreover, the dedicated control information may be transmitted by the wireless communication device NE52.

When, in the case where the uplink resource is not granted, the uplink data occurs and thus is available for transmission (T502), the equipment UE5 determines the priority of the uplink data (T503).

When the equipment UE5 determines that the uplink data is of low priority (T504), the equipment UE5 transmits the scheduling request (SR) to the wireless communication device NE52 using the dedicated scheduling request resource of SCell (T505). The wireless communication device NE52 notifies the equipment UE5 of the uplink resource that is granted in response to the received scheduling request (SR) (T506). The equipment UE5 transmits the uplink data to the wireless communication device NE52 using the uplink resource, the notification of which is given (T507).

On the other hand, if the equipment UE5 determines that the uplink data is of high priority, or if after the processing T505, the uplink source is not granted although the equipment UE5 transmits the scheduling request to the wireless communication device NE52 in SCell up to the maximum number of times of transmission that is set with the control information (T508), the equipment UE5 transmits the scheduling request (SR) to the wireless communication device NE51 using the dedicated scheduling request resource of PCell (T509). The wireless communication device NE51 notifies the equipment UE5 of the uplink resource that is granted in response to the received scheduling request (SR) (T510). The equipment UE5 transmits the uplink data to the wireless communication device NE51 using the uplink resource, the notification of which is given (T511).

FIG. 23 is a diagram illustrating one example of a timing chart that includes processing performed between the equipment UE5 and the wireless communication device NE51 if the uplink resource is not granted although the equipment UE5 performs the scheduling request. As illustrated in FIG. 23, after the processing T509 illustrated in FIG. 22, although the equipment UE5 transmits the scheduling request in PCell to the wireless communication device NE51 up to the maximum number of times of transmission that is set with the control information, if the uplink resource is not granted (T513), the equipment UE5 starts the random access procedure that uses a physical random access channel (PRACH) resource of PCell and thus transmits a random access preamble to the wireless communication device NE51 (T514). The wireless communication device NE51 creates a random access response that includes a notification of the uplink resource and transmits the created random access response to the equipment UE5 (T515). When receiving the random access response, the equipment UE5 transmits the uplink data to the wireless communication device NE51 using the uplink resource, the notification of which is given by the corresponding random access response.

[Configuration of the Equipment UE5 According to the Fifth Embodiment]

Figure 24:
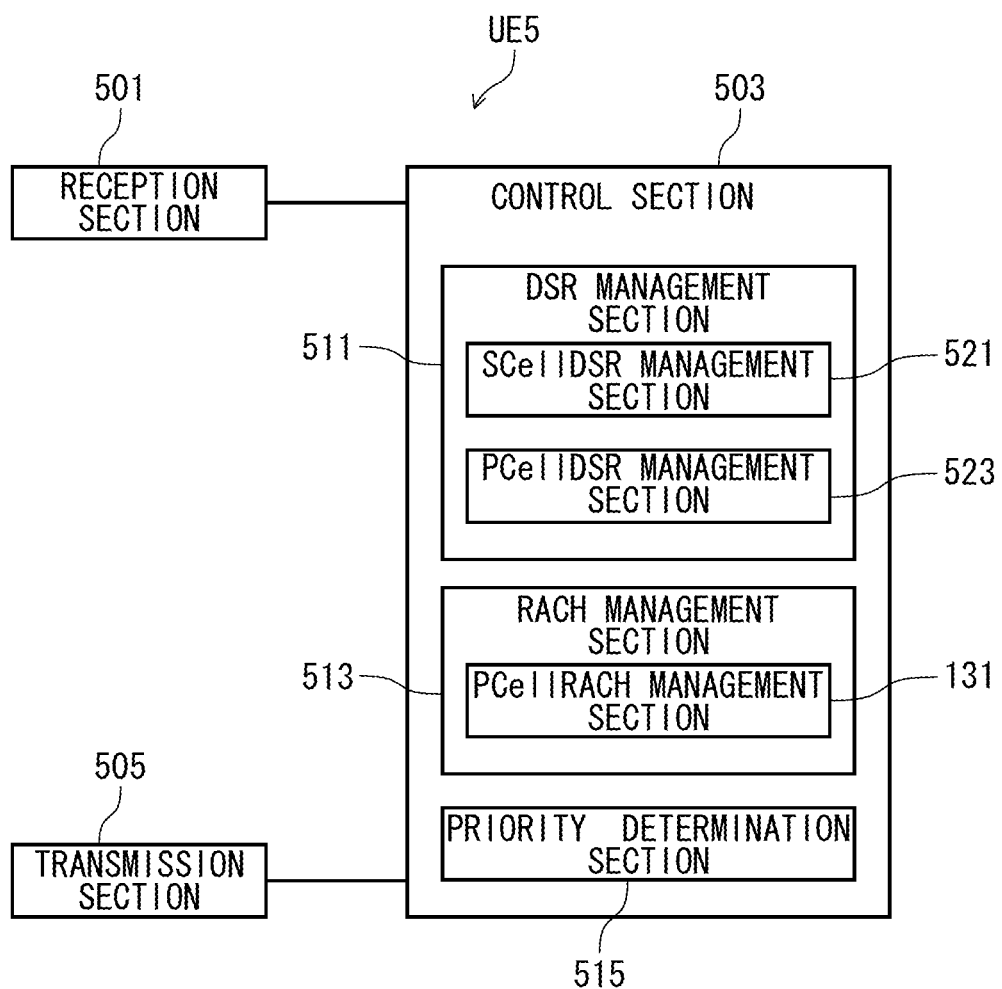
FIG. 24 is a block diagram of the equipment UE5 that makes up the wireless communication system according to the fifth embodiment.

FIG. 24 is a block diagram of the equipment UE5 that makes up the wireless communication system according to the fifth embodiment. As illustrated in FIG. 24, the equipment UE5 according to the fifth embodiment includes a reception section 501, a control section 503, and a transmission section 505. The control section 503 includes a DSR management section 511, an RACH management section 513, and a priority determination section 515. The DSR management section 511 includes a SCellDSR management section 521 and a PCellDSR management section 523. The RACH management section 513 includes the PCellRACH management section 131.

Moreover, the reception section 501 and transmission section 505 are the same as the reception section 101 and the transmission section 105 according to the first embodiment. Furthermore, a priority determination section 515 included in the control section 503 is the same as the priority determination section 315 according to the third embodiment. Furthermore, a SCellDSR management section 521 included in the DSR management section 511 is the same as the SCellDSR management section 121 according to the first embodiment. Furthermore, the RACH management section 513 is the same as the RACH management section 213 according to the second embodiment. The control section 503, the DSR management section 511, and the PCellDSR management section 523 according to the present embodiment are described below.

The control section 503 instructs the reception section 501 to receive the control information, such as the report information or the dedicated control information. The control information received by the reception section 501 is input into the control section 503. Information relating to a random access channel configuration (RACH config) that is included in the control information that is input into the control section 503 is input into the RACH management section 513 of the control section 503. Furthermore, the configuration information on the dedicated scheduling request resource that is included in the control information that is input into the control section 503 is input into the DSR management section 511 of the control section 503. Based on a state of the equipment UE5 and the control information, the control section 503 instructs the DSR management section 511 to release the dedicated scheduling request resource.

The control section 503 outputs determination-method setting information for determining the priority of the uplink data that is set in advance, or determination-method setting information for determining the priority of the uplink data, the notification of which is given with the dedicated control information, to the priority determination section 515. Based on a state of the equipment UE5 and the control information, the control section 503 instructs the DSR management section 511 to release the dedicated scheduling request resource.

If the uplink resource is not granted to the equipment UE5, when the uplink data occurs in the equipment UE5 and thus is available for transmission, the control section 503 inputs information relating to the uplink data into the priority determination section 515 in order for the priority determination section 515 to determine the priority. The control section 503 instructs the DSR management section 511 to transmit a result of determining the priority of the uplink data that is output from the priority determination section 515 and the scheduling request (SR). Moreover, after instructing the DSR management section 511 to transmit the scheduling request, when the uplink resource is granted to the equipment UE5, the control section 503 notifies the DSR management section 511 that the uplink resource is granted. Furthermore, when notified by the DSR management section 511 that the scheduling request cannot be transmitted, the control section 503 instructs the RACH management section 513 to start the random access procedure.

When information necessary for transmitting the uplink data, which is included in the random access response obtained from the RACH management section 513, is input, the control section 503 instructs the transmission section 505 to transmit the uplink data that is desired to be transmitted, using the designated uplink. Furthermore, when information necessary for transmitting the corresponding uplink data that is included in the random access response obtained from the RACH management section 513 and information indicating that the contention resolution is necessary are input, the control section 503 creates a message (message 3) based on these items of information and thus outputs the corresponding message to the transmission section 505.

If the reception section 501 receives the contention resolution message, the control section 503 outputs the corresponding message, which is input from the reception section 501, to the RACH management section 513. On the other hand, if the reception section 501 does not receive the contention resolution message, the control section 503 instructs the RACH management section 513 to re-transmit the random access preamble. When notified by the RACH management section 513 that the random access procedure fails, the control section 503 starts a re-establishment procedure.

The DSR management section 511 included in the control section 503 manages the configuration information on the dedicated scheduling request resource that is input from the control section 503. Moreover, the configuration information on the dedicated scheduling request resource includes the dedicated scheduling request resources (sr-PUUCCH-ResourceIndex, sr-ConfigIndex, and sr-PUCCH-ResourceIndex P1-r10), and the maximum possible number of times of transmission (dsr-Trans) of the scheduling request (SR) that uses the dedicated scheduling request resource, and so forth. Furthermore, the DSR management section 511 performs the release of a current configuration relating to the dedicated scheduling request resource that is designated by the control section 503.

When instructed by the control section 503 to transmit the dedicated scheduling request resource of SCell, the DSR management section 511 outputs the configuration information on the dedicated scheduling request resource relating to SCell to the SCellDSR management section 521. Furthermore, when instructed by the control section 503 to release the current configuration of the dedicated scheduling request resource relating to SCell, the DSR management section 511 instructs a SCellDSR management section 521 to release the configuration of the dedicated scheduling request resource.

Furthermore, when instructed by the control section 503 to transmit the dedicated scheduling request resource of PCell, the DSR management section 511 outputs the configuration information on the dedicated scheduling request resource relating to PCell to a PCellDSR management section 523. Furthermore, when instructed by the control section 503 to release the current configuration of the dedicated scheduling request resource relating to PCell, the DSR management section 511 instructs the PCellDSR management section 523 to release the configuration of the dedicated scheduling request resource.

When the result of the priority determination section 515 determining the priority of the uplink data and the instruction to transmit the scheduling request (SR) are input from the control section 503, if the uplink data is of low priority, the DSR management section 511 instructs the SCellDSR management section 521 to transmit the scheduling request. Thereafter, when notified by the control section 503 that the uplink resource is granted to the equipment UE5, the DSR management section 511 notifies the SCellDSR management section 521 that the uplink resource is granted.

When being notified by the SCellDSR management section 521 that the dedicated scheduling request resource is not set, and when determining that the equipment UE5 is in a state where the equipment UE5 cannot transmit the scheduling request, the DSR management section 511 instructs the PCellDSR management section 523 to transmit the scheduling request. Furthermore, when being notified by the SCellDSR management section 521 that the scheduling request fails to be transmitted, and when determining that the scheduling request cannot be transmitted to the wireless communication device that provides SCell, the DSR management section 511 instructs the PCellDSR management section 523 to transmit the scheduling request.

Furthermore, when the result of the priority determination section 515 determining the priority of the uplink data and the instruction to transmit the scheduling request (SR) are input from the control section 503, if the uplink data is of high priority, the DSR management section 511 instructs the PCellDSR management section 523 to transmit the scheduling request. Thereafter, when notified by the control section 503 that the uplink resource is granted to the equipment UE5, the DSR management section 511 notifies the PCellDSR management section 523 that the uplink resource is granted.

When notified by the PCellDSR management section 523 that the dedicated scheduling request resource is not set, and when determining that the equipment UE5 is in a state where the equipment UE5 cannot transmit the scheduling request, the DSR management section 511 notifies the control section 503 that the scheduling request cannot be transmitted. Furthermore, when being notified by the PCellDSR management section 523 that the scheduling request fails to be transmitted and when determining that the equipment UE5 is in the state where the equipment UE5 cannot transmit the scheduling request, the DSR management section 511 notifies the control section 503 that the scheduling request cannot be transmitted.

When instructed by the DSR management section 511 to transmit the scheduling request, the PCellDSR management section 523 included in the DSR management section 511 generates the scheduling request. Moreover, the PCellDSR management section 523 instructs the transmission section 505 to transmit the scheduling request at a timing that is based on the configuration information on the dedicated scheduling request resource. However, if the dedicated scheduling request resource is not set, the PCellDSR management section 523 notifies the DSR management section 511 that the dedicated scheduling request resource is not set.

When notified by the DSR management section 511 that the uplink resource is granted to the equipment UE5, the PCellDSR management section 523 stops an instruction to transmit the scheduling request. On the other hand, although the number of times of transmission of the scheduling request reaches the maximum possible number of times of transmission (dsr-Trans), if there is no notification of grant of the uplink resource, the PCellDSR management section 523 notifies the DSR management section 511 that the scheduling request fails. In this case, the PCellDSR management section 523 releases the dedicated scheduling request resource that is set.

[Configuration of the Wireless Communication Device NE51 According to the Fifth Embodiment]

Figure 25:
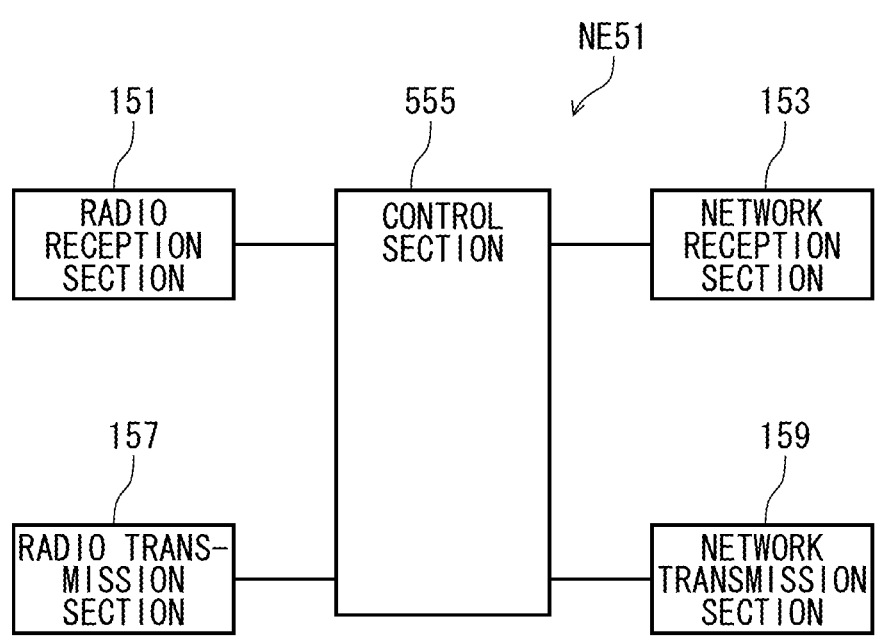
FIG. 25 is a block diagram of the wireless communication device NE51 that makes up the wireless communication system according to the fifth embodiment.

FIG. 25 is a block diagram of the wireless communication device NE51 that makes up the wireless communication system according to the fifth embodiment. As illustrated in FIG. 25, the wireless communication device NE51 according to the fifth embodiment includes the radio reception section 151, the network reception section 153, a control section 555, the radio transmission section 157, and the network transmission section 159. Because a difference between the wireless communication device NE51 according to the fifth embodiment and the wireless communication device NE11 according to the first embodiment is in operation of the control section 555, the control section 555 according to the present embodiment is described below.

In addition to the function of the control section 155 included in the wireless communication device NE11 according to the first embodiment, the control section 555 may include a function of creating the determination-method setting information for determining whether to transmit the scheduling request using the dedicated scheduling request resource of SCell, or to transmit the scheduling request using the dedicated scheduling request resource of PCell. Moreover, the determination-method setting information may include information that is described with the determination method examples 1 to 7 described according to the third embodiment. Furthermore, the determination-method setting information may include a flag indicating that if the uplink data is of low priority, the random access procedure in which the equipment plays a passive role may be started in SCell based on the determination-method setting information retained by the equipment UE5. The control section 555 creates the dedicated control information including the determination-method setting information and thus outputs the created dedicated control information to the radio transmission section 157.

(Operation of the Equipment UE5 According to the Fifth Embodiment)

Figure 26:
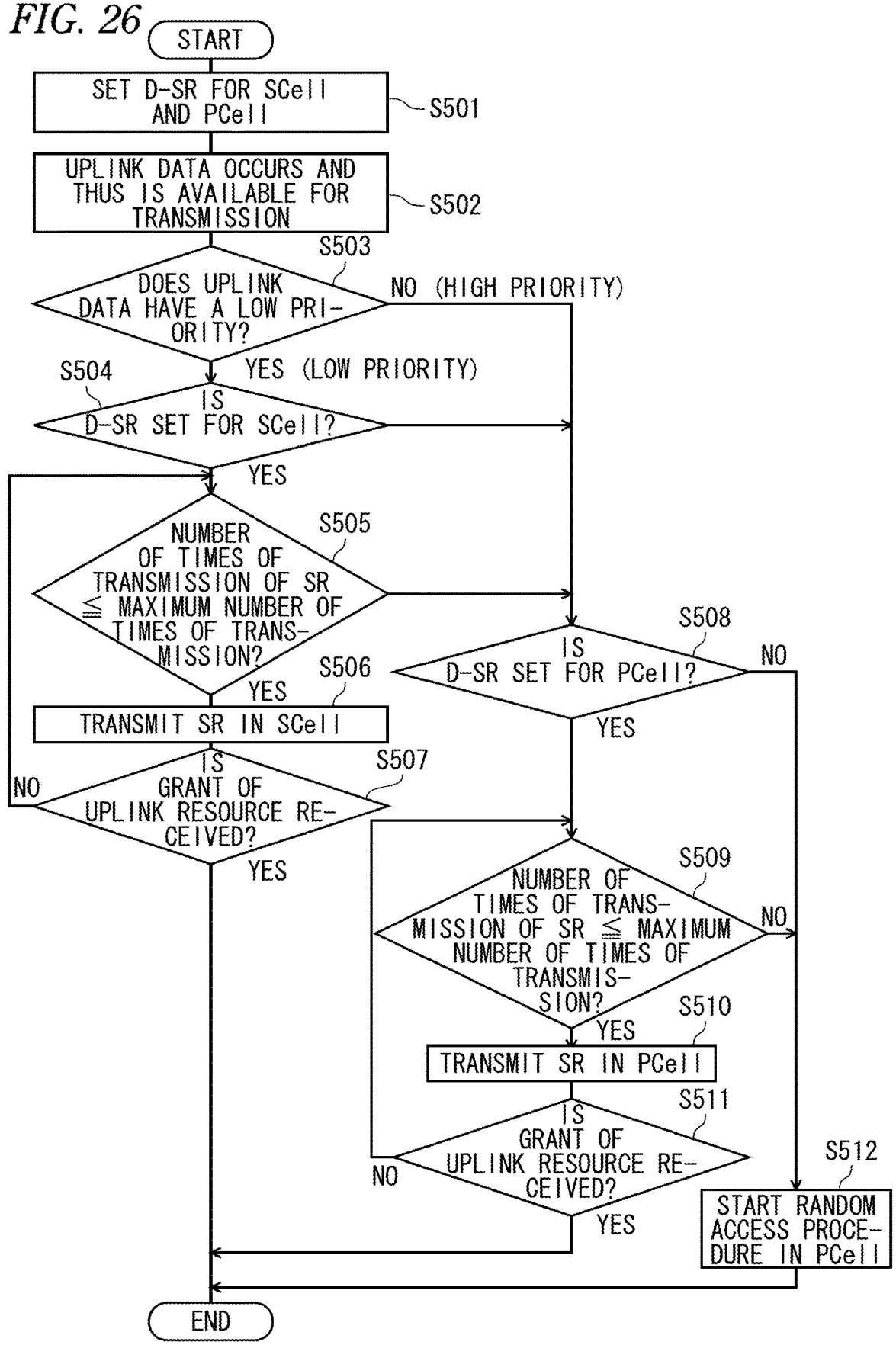
FIG. 26 is a flow chart illustrating operation of the equipment UE5 in the case where, in the state where the uplink resource is not granted to the equipment UE5, the uplink data occurs in the wireless communication terminal UE5 and thus is available for transmission, in the wireless communication system according to the fifth embodiment.
Figure 27:
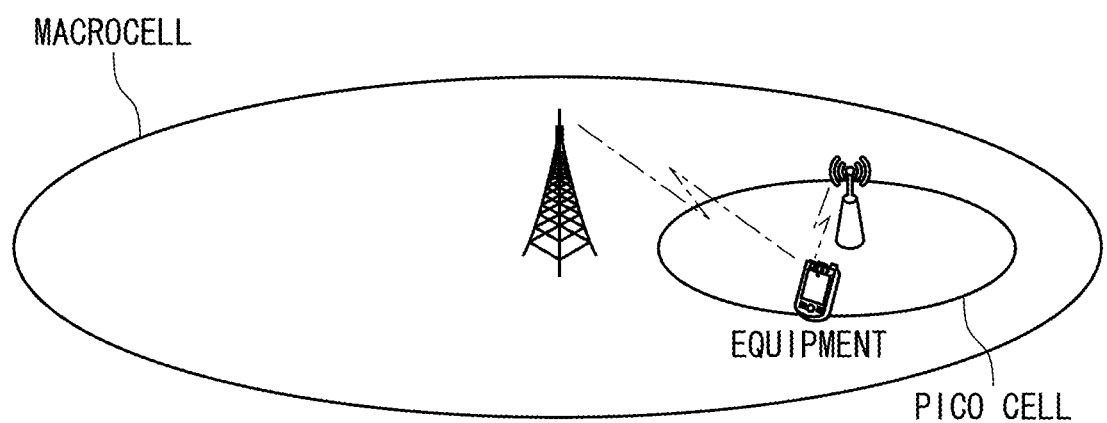
FIG. 27 is a diagram illustrating one example of the wireless communication system in a HetNet environment.

Operation of the equipment UE5 in the case where, in a state where the uplink resource is not granted to the equipment UE5, the uplink data occurs in the equipment UE5 and thus is available for transmission is described below referring to FIG. 26. FIG. 26 is a flow chart illustrating the operation of the equipment UE5 in the case where, in the state where the uplink resource is not granted to the equipment UE5, the uplink data occurs in the equipment UE5 and thus is available for transmission, in the wireless communication system according to the fifth embodiment.

As illustrated in FIG. 26, the dedicated scheduling request resource (D-SR) in SCell and PCell is set for the equipment UE5 (Step S501). Next, when in the state where the uplink is not granted, the uplink data occurs and thus is available for transmission (Step S502), the equipment UE5 proceeds to Step S503.

In Step S503, the equipment UE5 determines whether the uplink data is of high priority or of low priority, based on the determination-method setting information managed by the priority determination section 515. If the uplink data is of low priority, the equipment UE5 proceeds to Step S504. If the uplink data is of high priority, the equipment UE5 proceeds to Step S508.

In step S504, the equipment UE5 determines whether or not the dedicated scheduling request resource is set for SCell. If the dedicated scheduling request resource is set for SCell, the equipment UE5 proceeds to Step S505. If the dedicated scheduling request resource is not set for SCell, the equipment UE5 proceeds to Step S508. In Step S505, the equipment UE5 determines whether or not the number of times of transmission of the scheduling request that uses the dedicated scheduling request resource exceeds the maximum number of times of transmission (the number of times of transmission of the scheduling request≤the maximum number of times of transmission). If the number of times of transmission of the scheduling request that uses the dedicated scheduling request resource does not exceed the maximum number of times of transmission (Yes in S504), the equipment UE5 proceeds to Step S506. If the number of times of transmission of the scheduling request that uses the dedicated scheduling request resource exceeds the maximum number of times of transmission (No in S504), the equipment UE5 proceeds to Step S508.

In Step S506, the equipment UE5 transmits the scheduling request using the dedicated scheduling request resource of SCell. Next, the equipment UE5 determines whether or not the grant of the uplink resource is received (Step S507). If the uplink resource is granted, the equipment UE5 terminates a sequence of processing steps. If the uplink resource is not granted, the equipment UE5 returns to Step S505.

In step S508, the equipment UE5 determines whether or not the dedicated scheduling request resource is set for PCell. If the dedicated scheduling request resource is set for PCell, the equipment UE5 proceeds to Step S509. If the dedicated scheduling request resource is not set for PCell, the equipment UE5 proceeds to Step S512. In Step S509, the equipment UE5 determines whether or not the number of times of transmission of the scheduling request that uses the dedicated scheduling request resource exceeds the maximum number of times of transmission (the number of times of transmission of the scheduling request≤the maximum number of times of transmission). If the number of times of transmission of the scheduling request that uses the dedicated scheduling request resource does not exceed the maximum number of times of transmission (if Yes in S508), the equipment UE5 proceeds to Step S510. If the number of times of transmission of the scheduling request that uses the dedicated scheduling request resource exceeds the maximum number of times of transmission (No in S508), the equipment UE5 proceeds to Step S512.

In Step S510, the equipment UE5 transmits the scheduling request using the dedicated scheduling request resource of PCell. Next, the equipment UE5 determines whether or not the grant of the uplink resource is received (Step S511). If the uplink resource is granted, the equipment UE5 terminates a sequence of processing steps. If the uplink resource is not granted, the equipment UE5 returns to Step S509.

In Step S512, the equipment UE5 starts the random access procedure in PCell. Moreover, if the random access procedure in PCell fails, the equipment UE5 starts a re-connection procedure.

As illustrated above, according to the present embodiment, if the uplink data is of low priority, power consumption in the equipment UE5 can be reduced, because the equipment UE5 transmits the scheduling request using the dedicated scheduling request resource of SCell. Furthermore, if the uplink data is of high priority, the wireless communication device NE51 can preferentially deal with the request in PCell for the uplink resource because the equipment UE5 necessarily requests the uplink resource of PCell. Because of this, the scheduling relating to the grant of the uplink resource in the wireless communication device NE51 becomes easy.

Moreover, according to each of the embodiments described above, the example in which the equipment obtains the dedicated control information via the downlink of PCell is described, but the equipment may obtain the dedicated control information via the downlink of SCell. Furthermore, the example in which PCell and SCell are provided by different wireless communication devices is described, but PCell and SCell may be provided by the same wireless communication device. Moreover, the wireless communication device that is different from the wireless communication device that receives the scheduling request may notify the equipment of the uplink source. Furthermore, the wireless communication device that is different from the wireless communication device that receives the random access preamble may transmit the random access response to the equipment.

Moreover, the method described according to the fourth embodiment is combined with the other embodiments and thus can be put into use.

Moreover, the determination of whether or not the reception power for DL of the path loss reference cell that is used in calculating the transmission power when transmitting the scheduling request using the dedicated scheduling request resource described according to the fourth embodiment is at the threshold or above may be replaced with a determination of whether or not the uplink data described according to the third embodiment is of high priority. By doing this, if the uplink data is of low priority, the equipment transmits the scheduling request using the dedicated scheduling request resource of SCell and if the uplink data is of high priority, the equipment starts the random access procedure in PCell. In this case, because if the uplink data is of high priority, the uplink resource is always requested in PCell, power consumption by the equipment is reduced and the scheduling relating to the grant of the uplink resource in the wireless communication device can be easily performed. Moreover, in this case, after the scheduling request that uses the dedicated scheduling request resource of SCell fails, if the random access procedure in which the equipment plays a leading role is permitted in SCell, the equipment may start the random access procedure in SCell.

Moreover, according to each of the embodiments described above, the operation of the career aggregation is described using PCell and SCell, but a concept of the communication cell may be interpreted to mean a component career. Furthermore, the concept of the communication cell may be interpreted to mean a virtual cell that is a cell that is virtually formed using the multiple wireless communication devices. Furthermore, the concept of the communication cell may be interpreted to mean a phantom cell that changes in coverage because the multiple wireless communication devices or antennas operate cooperatively.

Moreover, according to each of the embodiments described above, if an SIB2 linked DL cell, a cell for which the dedicated scheduling request resource is set, is deactivated, the equipment does not transmit the scheduling request that uses the corresponding dedicated scheduling request resource. This is because the transmission power cannot be correctly computed with the deactivated cell. Moreover, if the SIB2 linked DL cell, the cell for which the dedicated scheduling request resource is set, is deactivated, the equipment may release the corresponding dedicated scheduling request resource. By doing this, the corresponding resource can be granted to other pieces of equipment.

Moreover, according to each of the embodiments described above, if the dedicated scheduling request resource that is set cannot be used, an operation is performed in the same manner as if the number of times of transmission of the dedicated scheduling request reaches a maximum value. However, if the cell that starts the random access procedure is in a deactivated state, the random access procedure is started in PCell.

Each of the embodiments is described using an example in which the present disclosure is configured in hardware, but the present disclosure can be realized also in software in cooperation with hardware.

Furthermore, each functional block that is used in describing each of the embodiments described above is realized as an LSI that is typically an integrated circuit. The functional blocks may be provided as individual chips, or some or all of the functional blocks may be provided as a single chip. Here, depending on differences in integration level, the LSI is referred to as an IC, a system LSI, a super LSI, or an ultra LSI.

Furthermore, a technique of integrating circuits is not limited to the LSI, and integrating circuits may be realized with a dedicated circuit or a general-purpose processor. After manufacturing the LSI, a field programmable gate array (FPGA) that is programmable or a reconfigurable processor in which connections or setting of circuit cells within the LSI are reconfigurable may be used.

Furthermore, if a technology of integrating circuits appears that is replaced with another technology that is advanced, or derived from a semiconductor technology, of course, integrating the functional blocks may be performed using such a technology. Another possibility is an application of biotechnology and the like.

Moreover, according to the embodiments described above, the description is provided using the antenna, but in the same manner, the application can be performed using an antenna port as well. The antenna port refers to a logical antenna that is configured from one or more physical antennas. That is, the antenna port does not refer necessarily to one physical antenna in a limited manner, and refers to the antenna and the like that are configured from the multiple antennas. For example, the long term evolution (LTE) does not stipulate how many of the physical antennas the antenna port is configured from, but stipulates the number of physical antennas as a minimum unit by which reference signals, different in base station can be transmitted. Furthermore, the antenna port is stipulated as the minimum unit by which weighting of a precoding vector is multiplied.

Each of the embodiments described above includes the following embodiment.

<Disclosure 1 of Wireless Communication Terminal UE>

Wireless communication terminal in which, among two types of cells that make up a component career set that is used in career aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal including a DSR management section that, when uplink data occurs in the wireless communication terminal, performs processing that requests the grant of the uplink resource from the wireless communication device by transmitting the scheduling request to the wireless communication device using the dedicated scheduling request resource of the second cell, if the uplink resource is not granted to the wireless communication terminal, and a RACH management section that performs a random access procedure that requests the grant of the uplink resource from the wireless communication device by transmitting a random access preamble to the wireless communication device, if the grant of the uplink resource in response to the scheduling request is not performed.

<Disclosure 2 of the Wireless Communication Terminal UE>

The wireless communication terminal according to Disclosure 1, in which the RACH management section performs the random access procedure in the second cell if the uplink resource is not granted although the scheduling request is received, and performs the random access procedure in the first cell if the random access procedure in the second cell fails.

<Disclosure 3 of the Wireless Communication Terminal UE>

The wireless communication terminal according to Disclosure 1, in which the RACH management section performs the random access procedure in the first cell if the uplink resource is not granted although the scheduling request is transmitted.

<Disclosure 4 of the Wireless Communication Terminal UE>

The wireless communication terminal according to Disclosure 1, further including a priority determination section that determines whether the uplink data is of high priority or of low priority, using a predetermined determination method, in which the RACH management section performs the random access procedure in the first cell if it is determined that the uplink data is of high priority and performs the random access procedure in the second cell if it is determined that the uplink data is of low priority.

<Disclosure 5 of the Wireless Communication Terminal UE>

The wireless communication terminal according to Disclosure 4, in which the RACH management section performs the random access procedure in the first cell if the random access procedure in the second cell fails.

<Disclosure 6 of the Wireless Communication Terminal UE>

The wireless communication terminal according to any one of Disclosures 1 to 5, in which the case where the uplink resource is not granted although the scheduling request is transmitted is a case where the uplink resource is not granted to the wireless communication terminal although the DSR management transmits the scheduling request, a predetermined number of times, to the wireless communication device.

<Disclosure 7 of the Wireless Communication Terminal UE>

Wireless communication terminal in which, among two types of cells that make up a component career set that is used in career aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal including a comparison section that, when uplink data occurs in the wireless communication terminal, compares a path loss value that is present when a scheduling request is transmitted to the wireless communication device using the dedicated scheduling request resource of the second cell, with a threshold, if the uplink is not granted to the wireless communication terminal, a DSR management section that performs processing that requests the grant of the uplink resource from the wireless communication device by transmitting the scheduling request to the wireless communication device using the dedicated scheduling request resource of the second cell, if the path loss value is at the threshold or above, and a RACH management section that performs a random access procedure in the first cell that requests the grant of the uplink resource from the wireless communication device by transmitting a random access preamble to the wireless communication device, if the path loss value is below the threshold.

<Disclosure 8 of the Wireless Communication Terminal UE>

Wireless communication terminal in which, among two types of cells that make up a component career set that is used in career aggregation, a dedicated scheduling request resource that is used when transmitting a scheduling request for requesting grant of an uplink resource from a wireless communication device capable of communicating with the wireless communication terminal is set for a second cell that is smaller in cell coverage than a first cell, the wireless communication terminal including a priority determination section that, when uplink data occurs in the wireless communication terminal, determines whether the uplink data is of high priority or of low priority using a predetermined determination method, if the uplink resource is not granted to the wireless communication terminal, a DSR management section that performs processing that requests the grant of the uplink resource to the wireless communication device by transmitting the scheduling request to the wireless communication device using the dedicated scheduling request resource of the second cell, if it is determined that the uplink data is of low priority, and a RACH management section that performs a random access procedure in the first cell that requests the grant of the uplink resource from the wireless communication device by transmitting a random access preamble to the wireless communication device, if it is determined that the uplink data is of high priority.

<Disclosure 9 of the Wireless Communication Terminal UE>

The wireless communication terminal according to Disclosure 7 or 8, in which the RACH management section performs the random access procedure in the first cell if the uplink resource is not granted to the wireless communication terminal although the DSR management transmits the scheduling request, a predetermined number of times, to the wireless communication device.

<Disclosure 10 of the Wireless Communication Terminal UE>

Wireless communication terminal in which, among two types of cells that make up a component career set that is used in career aggregation, a dedicated scheduling request resource that is used when transmitting a scheduling request for requesting grant of an uplink resource from a wireless communication device capable of communicating with the wireless communication terminal is set for a second cell that is smaller in cell coverage than a first cell, the wireless communication terminal including a priority determination section that, when uplink data occurs in the wireless communication terminal, determines whether the uplink data is of high priority or of low priority using a predetermined determination method, if the uplink resource is not granted to the wireless communication terminal, and a DSR management section that performs processing that requests the grant of the uplink resource to the wireless communication device by transmitting the scheduling request to the wireless communication device using the dedicated scheduling request resource of the first cell or the second cell, in which the DSR management section transmits the scheduling request using the dedicated scheduling request resource of the second cell if it is determined that the uplink data is of low priority, and the DSR management section transmits the scheduling request using the dedicated scheduling request resource of the first cell if it is determined that the uplink data is of high priority or if the uplink source is not granted although the scheduling request is transmitted in the second cell.

<Disclosure 11 of the Wireless Communication Terminal UE>

The wireless communication terminal according to Disclosure 10, further including a RACH management section that performs a random access procedure in the first cell that requests the grant of the uplink resource to the wireless communication device by transmitting a random access preamble to the wireless communication device if the uplink resource is not granted although the scheduling request is transmitted in the first cell.

<Disclosure 12 of the Wireless Communication Terminal UE>

The wireless communication terminal according to Disclosure 10 or 11, in which the case where the uplink resource is not granted although the scheduling request is transmitted is a case where the uplink resource is not granted to the wireless communication terminal although the DSR management section transmits the scheduling request, a predetermined number of times, to the wireless communication device.

<Disclosure 1 of a Wireless Communication Device NE>

A wireless communication device, capable of communicating with wireless communication terminal, which among two types of cells that make up a component carrier set that is used in carrier aggregation, provides a second cell that is smaller in cell coverage than a first cell, which transmits dedicated control information that includes configuration information relating to a dedicated scheduling request resource of the second cell that is available to the wireless communication terminal, to the wireless communication terminal.

<Disclosure 2 of the Wireless Communication Device NE>

The wireless communication device according to Disclosure 1, in which the dedicated control information includes permission information that gives an instruction to start a random access procedure in which the wireless communication terminal plays a leading role in the second cell in order to obtain grant of an uplink resource.

<Disclosure of a Wireless Communication System>

A wireless communication system including a wireless communication device, capable of communicating with wireless communication terminal, which among two types of cells that make up a component carrier set that is used in carrier aggregation, provides a second cell that is smaller in cell coverage than a first cell, and wireless communication terminal in which a dedicated scheduling request resource that is used when transmitting a scheduling request for requesting grant of an uplink resource to the wireless communication device is set for the second cell, in which the wireless communication device transmits dedicated control information that includes configuration information relating to a dedicated scheduling request resource of the second cell that is available to the wireless communication terminal, to the wireless communication terminal, and in which the wireless communication terminal includes a DSR management section that, when uplink data occurs in the wireless communication terminal, performs processing that requests the grant of the uplink resource to the wireless communication device by transmitting the scheduling request to the wireless communication device using the dedicated scheduling request resource of the second cell, if the uplink resource is not granted to the wireless communication terminal, and a RACH management section that performs a random access procedure that requests the grant of the uplink resource to the wireless communication device by transmitting a random access preamble to the wireless communication device, if the grant of the uplink resource in response to the scheduling request is not performed.

<Disclosure of a Method of Processing an Uplink Resource Request>

A method of processing an uplink resource request, for use in wireless communication terminal, in which a dedicated scheduling request resource that is used when transmitting a scheduling request for requesting grant of an uplink resource to a wireless communication device that is capable of communicating with the wireless communication terminal is set for a second cell that is smaller in cell coverage than a first cell, among two types of cells that make up a component carrier set that is used in carrier aggregation, the method including performing processing that requests the grant of the uplink resource from the wireless communication device by transmitting the scheduling request to the wireless communication device using the dedicated scheduling request resource of the second cell when uplink data occurs in the wireless communication terminal if the uplink resource is not granted to the wireless communication terminal, and performing a random access procedure that requests the grant of the uplink resource from the wireless communication device by transmitting a random access preamble to the wireless communication device if the grant of the uplink resource in response to the scheduling request is not performed.

While the present invention has been described in detail, or with reference to the specific embodiments, it is apparent for those skilled in the art that the invention may be modified and changed in various manners without departing from the scope and spirit of the invention.

This invention is based on Japanese Patent Application (Japanese Patent Application No. 2012-123831) filed on May 31, 2012, the content of which is incorporated herein by reference.

INDUSTRIAL APPLICABILITY

The wireless communication terminal and the wireless communication device according to the present disclosure are useful as wireless communication terminal and a wireless communication device that are capable of maintaining reliability of connectivity between the wireless communication terminal and the wireless communication device while reducing power consumption in the wireless communication terminal.

REFERENCE SIGNS LIST

UE, UE1, UE2, UE3, UE4, UE5 WIRELESS COMMUNICATION TERMINAL (EQUIPMENT)
NE1, NE2, NE11, NE12, NE21, NE22, NE31, NE32, NE41, NE42, NE51, NE52 WIRELESS COMMUNICATION DEVICE
101, 401, 501 RECEPTION SECTION
103, 203, 303, 403, 503 CONTROL SECTION
105, 505 TRANSMISSION SECTION
111, 511 DSR MANAGEMENT SECTION
113, 213, 513 RACH MANAGEMENT SECTION
121, 521 SCellDSR MANAGEMENT SECTION
131 PCellRACH MANAGEMENT SECTION
133 SCellRACH MANAGEMENT SECTION
315, 515 PRIORITY DETERMINATION SECTION
415 SCellDL MONITORING SECTION
523 PCellDSR MANAGEMENT SECTION
151, 161 RADIO RECEPTION SECTION
153, 163 NETWORK RECEPTION SECTION
155, 165, 355, 455, 555 CONTROL SECTION
157, 167 RADIO TRANSMISSION SECTION
159, 169 NETWORK TRANSMISSION SECTION

What is claimed is:

1. A wireless communication terminal in which, among two types of cells that make up a component carrier set that is used in carrier aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal comprising:

a dedicated scheduling request ("DSR") management section configured to, when the uplink resource is not granted to the wireless communication terminal and when uplink data occurs in the wireless communication terminal, perform processing that requests the grant of the uplink resource to the wireless communication device by transmitting the scheduling request to the wireless communication device using the dedicated scheduling request resource of the second cell; and a random access channel ("RACH") management section configured to perform a random access procedure that requests the grant of the uplink resource to the wireless communication device by transmitting a random access preamble to the wireless communication device, when the grant of the uplink resource in response to the scheduling request is not performed.

2. The wireless communication terminal according to claim 1,
wherein the RACH management section
is configured to perform the random access procedure in the second cell when the uplink resource is not granted although the scheduling request is transmitted, and
is configured to perform the random access procedure in the first cell if the random access procedure in the second cell fails.

3. The wireless communication terminal according to claim 1,
wherein the RACH management section is configured to perform the random access procedure in the first cell when the uplink resource is not granted although the scheduling request is transmitted.

4. The wireless communication terminal according to claim 1, further comprising:
a priority determination section configured to determine whether the uplink data is of high priority or of low priority, using a predetermined determination method,
wherein the RACH management section is configured to perform the random access procedure in the first cell if it is determined that the uplink data is of high priority and perform the random access procedure in the second cell if it is determined that the uplink data is of low priority.

5. The wireless communication terminal according to claim 4,
wherein the RACH management section is configured to perform the random access procedure in the first cell if the random access procedure in the second cell fails.

6. The wireless communication terminal according to claim 1,
wherein the case where the uplink resource is not granted although the scheduling request is transmitted is a case where the uplink resource is not granted to the wireless communication terminal although the DSR management transmits the scheduling request, a predetermined number of times, to the wireless communication device.

7. A wireless communication terminal in which among two types of cells that make up a component carrier set that is used in carrier aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal comprising:
a comparison section configured to, when uplink data occurs in the wireless communication terminal, compare a path loss value that is present when a scheduling request is transmitted to the wireless communication device using the dedicated scheduling request resource of the second cell, with a threshold, when the uplink resource is not granted to the wireless communication terminal;
a dedicated scheduling request ("DSR") management section configured to, when the uplink resource is not granted to the wireless communication terminal, perform processing that requests the grant of the uplink resource to the wireless communication device by transmitting the scheduling request to the wireless communication device using the dedicated scheduling request resource of the second cell, if the path loss value is at the threshold or above; and
a random access channel ("RACH") management section configured to perform a random access procedure in the first cell that requests the grant of the uplink resource to the wireless communication device by transmitting a random access preamble to the wireless communication device, if the path loss value is below the threshold.

8. A wireless communication terminal in which among two types of cells that make up a component carrier set that is used in carrier aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal comprising:
a priority determination section configured to, when uplink data occurs in the wireless communication terminal, determine whether the uplink data is of high priority or of low priority using a predetermined determination method, when the uplink resource is not granted to the wireless communication terminal;
a dedicated scheduling request ("DSR") management section configured to, when the uplink resource is not granted to the wireless communication terminal, perform processing that requests the grant of the uplink resource to the wireless communication device by transmitting the scheduling request to the wireless communication device using the dedicated scheduling request resource of the second cell, if it is determined that the uplink data is of low priority; and
a random access channel ("RACH") management section configured to perform a random access procedure in the first cell that requests the grant of the uplink resource to the wireless communication device by transmitting a random access preamble to the wireless communication device, if it is determined that the uplink data is of high priority.

9. The wireless communication terminal according to claim 7,
wherein the RACH management section is configured to perform the random access procedure in the first cell when the uplink resource is not granted to the wireless communication terminal although the DSR management transmits the scheduling request, a predetermined number of times, to the wireless communication device.

10. A wireless communication terminal in which if among two types of cells that make up a component carrier set that is used in carrier aggregation, a dedicated scheduling request resource that is used when transmitting a scheduling request for requesting grant of an uplink resource to a wireless communication device capable of communicating with the wireless communication terminal is set for a second cell that is smaller in cell coverage than a first cell, the wireless communication terminal comprising:
a priority determination section configured to, when uplink data occurs in the wireless communication terminal, determine whether the uplink data is of high priority or of low priority using a predetermined determination method, when the uplink resource is not granted to the wireless communication terminal; and
a dedicated scheduling request ("DSR") management section configured to, when the uplink resource is not granted to the wireless communication terminal, perform processing that requests the grant of the uplink resource from the wireless communication device by transmitting the scheduling request to the wireless communication device using the dedicated scheduling request resource of the first cell or the second cell, wherein the DSR management section is configured to transmit the scheduling request using the dedicated scheduling request resource of the second cell if it is determined that the uplink data is of low priority, and the DSR management section is configured to transmit the scheduling request using the dedicated scheduling request resource of the first cell if it is determined that the uplink data is of high priority or when the uplink source is not granted although the scheduling request is transmitted in the second cell.

11. The wireless communication terminal according to claim 10, further comprising:
a random access channel ("RACH") management section configured to perform a random access procedure in the first cell that requests the grant of the uplink resource to the wireless communication device by transmitting a random access preamble to the wireless communication device when the uplink resource is not granted although the scheduling request is transmitted in the first cell.

12. The wireless communication terminal according to claim 10,
wherein the case where the uplink resource is not granted although the scheduling request is transmitted is a case where the uplink resource is not granted to the wireless communication terminal although the DSR management section transmits the scheduling request, a predetermined number of times, to the wireless communication device.

13. A wireless communication device, capable of communicating with wireless communication terminal which among two types of cells that make up a component carrier set that is used in carrier aggregation, provides a second cell that is smaller in cell coverage than a first cell, said wireless communication device comprising:
a radio reception section configured to receive a scheduling request for requesting grant of an uplink resource from the wireless communication terminal; and
a control section configured to, when the uplink resource is not granted to the wireless communication terminal, transmit to the wireless communication terminal dedicated control information that includes configuration information relating to a dedicated scheduling request resource of the second cell that is available to the wireless communication terminal.

14. The wireless communication device according to claim 13,
wherein the dedicated control information includes permission information that gives an instruction to start a random access procedure in which the wireless communication terminal uses a physical random access channel ("PRACH") resource of the second cell in order to obtain grant of an uplink resource.

15. A wireless communication system comprising:
a wireless communication device, capable of communicating with wireless communication terminal which among two types of cells that make up a component carrier set that is used in carrier aggregation, provides a second cell that is smaller in cell coverage than a first cell; and
wireless communication terminal in which a dedicated scheduling request resource that is used when transmitting a scheduling request for requesting grant of an uplink resource to the wireless communication device is set for the second cell, wherein the wireless communication device is configured to transmit dedicated control information that includes configuration information relating to a dedicated scheduling request resource of the second cell that is available to the wireless communication terminal, to the wireless communication terminal, and wherein the wireless communication terminal includes
a dedicated scheduling request ("DSR") management section configured to, when the uplink resource is not granted to the wireless communication terminal and when uplink data occurs in the wireless communication terminal, perform processing that requests the grant of the uplink resource to the wireless communication device by transmitting the scheduling request to the wireless communication device using the dedicated scheduling request resource of the second cell, and
a random access channel ("RACH") management section configured to perform a random access procedure that requests the grant of the uplink resource to the wireless communication device by transmitting a random access preamble to the wireless communication device, when the grant of the uplink resource in response to the scheduling request is not performed.

16. A method of processing an uplink resource request, for use in wireless communication terminal in which a dedicated scheduling request resource that is used when transmitting a scheduling request for requesting grant of an uplink resource to a wireless communication device that is capable of communicating with the wireless communication terminal is set for a second cell that is smaller in cell coverage than a first cell, among two types of cells that make up a component carrier set that is used in carrier aggregation, the method comprising:
performing processing that requests the grant of the uplink resource to the wireless communication device, when the uplink resource is not granted to the wireless communication terminal, by transmitting the scheduling request to the wireless communication device using the dedicated scheduling request resource of the second cell when uplink data occurs in the wireless communication terminal; and
performing a random access procedure that requests the grant of the uplink resource to the wireless communication device by transmitting a random access preamble to the wireless communication device when the grant of the uplink resource in response to the scheduling request is not performed.

17. A method of processing an uplink resource request to a wireless communication device communicating with a wireless communication terminal, the method comprising the steps of:
providing, by the wireless communication device, a first cell and a second cell among two types of cells that make up a component carrier set used in carrier aggregation, wherein the second cell is smaller in cell coverage than the first cell;
setting, by the wireless communication device, a dedicated scheduling request resource for the second cell;
transmitting a scheduling request for requesting grant of an uplink resource from the wireless communication terminal to the wireless communication device;
when the uplink resource is not granted to the wireless communication terminal and when uplink data occurs in the wireless communication terminal, requesting the grant of the uplink resource by transmitting the scheduling request to the wireless communication device using the dedicated scheduling request resource of the second cell; and performing a random access procedure that requests the grant of the uplink resource to the wireless communication device by transmitting a random access preamble to the wireless communication device when the uplink resource is not granted.

18. The wireless communication terminal according to claim 1, wherein the dedicated scheduling request resource set for the second cell is a physical uplink control channel ("PUCCH") resource.

* * * * *